US012534546B2

(12) United States Patent
Choe et al.

(10) Patent No.: US 12,534,546 B2
(45) Date of Patent: Jan. 27, 2026

(54) POLYETHYLENE AND PREPARATION METHOD THEREOF

(71) Applicant: LG Chem, Ltd., Seoul (KR)

(72) Inventors: Yeonji Choe, Daejeon (KR); Jongchan Lee, Daejeon (KR); Jeongkyu Lee, Daejeon (KR); Christine Jisoo Song, Daejeon (KR); Hee Su Oh, Daejeon (KR); Jiwon Yoon, Daejeon (KR); Yi Young Choi, Daejeon (KR); Sung Joon Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 519 days.

(21) Appl. No.: 18/036,091

(22) PCT Filed: Nov. 29, 2021

(86) PCT No.: PCT/KR2021/017790
§ 371 (c)(1),
(2) Date: May 9, 2023

(87) PCT Pub. No.: WO2022/114904
PCT Pub. Date: Jun. 2, 2022

(65) Prior Publication Data
US 2024/0026041 A1   Jan. 25, 2024

(30) Foreign Application Priority Data

Nov. 30, 2020 (KR) .......... 10-2020-0165107
Nov. 26, 2021 (KR) .......... 10-2021-0166153

(51) Int. Cl.
*C08F 10/02* (2006.01)
(52) U.S. Cl.
CPC .................. *C08F 10/02* (2013.01)
(58) Field of Classification Search
CPC ...... C08F 10/02; C08F 210/08; C08F 210/16; C08F 2420/01; C08F 2500/04; C08F 2500/07; C08F 2500/12; C08F 2500/33; C08F 2500/34; C08F 4/65912; C08F 4/65916; C08F 4/6592
See application file for complete search history.

(56) References Cited

U.S. PATENT DOCUMENTS

| | | |
|---|---|---|
| 5,914,289 A | 6/1999 | Razavi |
| 6,756,505 B1 | 6/2004 | Kristen et al. |
| 2003/0149180 A1 | 8/2003 | Van Dun et al. |
| 2010/0279087 A1 | 11/2010 | Tokiwa et al. |
| 2011/0160413 A1 | 6/2011 | Lee et al. |
| 2011/0171407 A1 | 7/2011 | Mazzola et al. |
| 2013/0211020 A1 | 8/2013 | Lee et al. |
| 2013/0247987 A1 | 9/2013 | Taniguchi et al. |
| 2015/0141599 A1 | 5/2015 | Greco |
| 2016/0115285 A1 | 4/2016 | Gao et al. |
| 2017/0260304 A1 | 9/2017 | Al-Shammari et al. |
| 2020/0223962 A1 | 7/2020 | Kim et al. |
| 2022/0010110 A1 | 1/2022 | Cho et al. |

FOREIGN PATENT DOCUMENTS

| | | |
|---|---|---|
| JP | 2002532508 A | 10/2002 |
| JP | 2004244557 A | 9/2004 |
| JP | 2006206500 A | 8/2006 |
| JP | 2008527050 A | 7/2008 |
| JP | 2009007579 A | 1/2009 |
| JP | 2010260229 A | 11/2010 |
| JP | 2011111579 A | 6/2011 |
| JP | 2013527271 A | 6/2013 |
| JP | 5620130 B2 | 11/2014 |
| JP | 2016128557 A | 7/2016 |
| JP | 6699175 B2 | 5/2020 |
| KR | 200312308 Y1 | 5/2003 |
| KR | 20040076965 A | 9/2004 |
| KR | 20120120207 A | 11/2012 |
| KR | 20130143068 A | 12/2013 |
| KR | 20160121940 A | 10/2016 |
| KR | 20180067944 A | 6/2018 |
| KR | 20190062176 A | 6/2019 |
| KR | 20200101873 A | 8/2020 |
| WO | 2004076502 A1 | 9/2004 |
| WO | 2016037960 A1 | 3/2016 |
| WO | 2016167547 A1 | 10/2016 |

OTHER PUBLICATIONS

Alexakis, A. et al., "Mild Protection and Deprotection of Alcohols as Ter-butyl Ethers in the Field of Pheromone Synthesis" Tetrahedron Letters, Elsevier, Feb. 1988, vol. 29, Issue 24, pp. 2951-2954.
International Search Report for Application No. PCT/KR2021/017790 mailed Mar. 7, 2022. 4 pages.

*Primary Examiner* — Ana L. Woodward
(74) *Attorney, Agent, or Firm* — Lerner David LLP

(57) ABSTRACT

Provided are a polyethylene having excellent processability and capable of reducing an injection molding defect rate, and a method of preparing the same. The polyethylene has an integral value in the region where the Log Mw is 5.5 or more in a GPC curve, wherein the x-axis is log Mw and the y-axis is dw/dlogMw, of 9% or less of the total integral value: and has a ratio (Tc10/Tc40) of a crystallization temperature (Tc10) measured at a cooling rate of 10° C./min to a crystallization temperature (Tc40) measured at a cooling rate of 40° C./min of less than 1.04.

17 Claims, No Drawings

POLYETHYLENE AND PREPARATION METHOD THEREOF

CROSS-REFERENCE TO RELATED APPLICATION(S)

The present application is a national stage entry under 35 U.S.C. § 371 of International Application No. PCT/KR2021/017790 filed on Nov. 29, 2021, which claims priority from Korean Patent Applications No. 10-2020-0165107 filed on Nov. 30, 2020, and No. 10-2021-0166153 filed Nov. 26, 2021, all the disclosures of which are incorporated herein by reference.

TECHNICAL FIELD

The present invention relates to a polyethylene having excellent processability and capable of reducing an injection molding defect rate, and a method of preparing the same.

BACKGROUND

A demand for polyethylene resins is gradually increasing and polyethylene resins are used in various applications. With a demand for high-performance polyethylene for relatively new plastics, polymerization process technologies have been developed to support production of new polymeric materials.

Generally, olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that a molecular weight distribution of polymers is broad. Also, since compositional distribution of comonomers is not uniform, there is a problem in that it has a limitation in securing the desired physical properties.

In contrast, the metallocene catalyst consists of a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform composition distribution of comonomers, depending on the single site characteristics. The metallocene catalyst has features capable of changing the stereoregularity, copolymerization characteristics, molecular weight, crystallinity, etc. of the polymer by changing a ligand structure of the catalyst and polymerization conditions.

U.S. Pat. No. 5,914,289 describes a method of controlling the molecular weight and the molecular weight distribution of polymers using metallocene catalysts which are respectively supported on supports. However, a large amount of solvent and a long preparation time are required for preparing the supported catalysts, and a process of supporting metallocene catalysts on the respective supports is troublesome.

Korean Patent Application No. 2003-12308 discloses a method of controlling the molecular weight distribution by polymerizing polymers while changing a combination of catalysts in a reactor by supporting a dinuclear metallocene catalyst and a mononuclear metallocene catalyst on a support together with an activating agent. However, this method has a limitation in implementing characteristics of the respective catalysts at the same time. In addition, there is a disadvantage that the metallocene catalyst portion is released from the support component of the final catalyst to cause fouling in the reactor.

Meanwhile, when polyethylene is used in the production of injection-molded products such as bottle caps, etc., it is generally required to have superior chemical properties, such as excellent processability, mechanical properties, high levels of environmental stress crack resistance (ESCR), etc. Accordingly, there has been a continuous demand for the technology for producing a polyethylene which is preferably appliable to containers or bottle caps by satisfying a high molecular weight, a broader molecular weight distribution, a desirable comonomer distribution, etc.

In particular, when a bottle cap is manufactured using a high-density polyethylene, hairs are generated, which are one of molding defects that occur as the resin not hardened in a gate area of the cap is stretched during cap injection processing. Factors affecting the hair generation have not yet been clearly identified, and the problem has been solved mainly by increasing viscosity through lowering the processing temperature. For example, the hair generation rate varies in the same resin depending on the mold (a cooling rate during injection). However, in some cases, according to various resins and characteristics of molds, the problem may not be solved even by increasing the viscosity through lowering the temperature, and this remains as a problem to be solved in the future.

Therefore, to control the hair generation rate, understanding of the mechanism and the molecular structural approach are needed. The hair generation mechanism may be largely divided into two stages: 1) initial hair generation and 2) growth of the generated hair, and factors affecting each stage are different. The factors involved in the initial hair generation include a solidification temperature, a crystallization temperature (Tc), Tc distribution, mold design, and the like, and the factors involved in the hair growth include viscosity, elongational viscosity and the like. In addition, when a polyethylene resin is prepared using a Ziegler-Natta catalyst, it has a broad crystallization distribution and a low crystallization temperature that induce initial hair generation due to a relatively broad molecular weight distribution.

Accordingly, to solve the above disadvantages, it is more necessary to develop a polyethylene capable of reducing the hair generation rate while lowering the dependence on processing conditions such as a cooling rate, etc., when manufacturing injection-molded products such as bottle caps, etc.

DETAILED DESCRIPTION OF THE INVENTION

Technical Problem

There is provided a polyethylene for manufacturing an injection-molded product, which has excellent processability to improve injection molding defects, in particular, to reduce a hair generation rate.

There is also provided a method of preparing the above-described polyethylene for manufacturing an injection-molded product.

There is also provided an injection-molded product including the above-described polyethylene.

Technical Solution

According to one embodiment of the present invention, there is provided a polyethylene, wherein an integral value in the region where the Log Mw is 5.5 or more in a GPC curve of the polyethylene, wherein the x-axis is log Mw and the y-axis is dw/dlogMw, is 9% or less of the total integral value, and a ratio ($Tc_{10}/Tc_{40}$) of a crystallization temperature ($Tc_{10}$) measured at a cooling rate of 10° C./min to a crystallization temperature ($Tc_{40}$) measured at a cooling rate of 40° C./min is less than 1.04.

There is also provided a method of preparing the above-described polyethylene for manufacturing an injection-molded product.

There is also provided an injection-molded product including the above-described polyethylene.

Advantageous Effects

According to the present invention, it is possible to provide a high-density polyethylene having a low hair generation rate during injection and low dependence on processing conditions, such as a cooling rate, etc., during injection by optimizing a molecular weight distribution in the high molecular weight region and crystallization temperatures ($Tc_{10}$ and $Tc_{40}$) according to cooling rates.

DETAILED DESCRIPTION OF THE EMBODIMENTS

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

The terms "about", "substantially" or the like used throughout this specification have the meaning of proximity to the corresponding number when a specific allowable error for preparation or materials is defined, and are used in order to prevent any unscrupulous invader from unduly using the disclosure about an accurate or absolute number provided to help understanding of the present disclosure.

Further, "parts by weight", as used herein, refers to a relative concept of a ratio of the weights of other materials based on the weight of a specific material. For example, in a mixture containing 50 g of material A, 20 g of material B, and 30 g of material C, the amounts of material B and material C based on 100 parts by weight of material A are 40 parts by weight and 60 parts by weight, respectively.

Further, "wt % (% by weight)" refers to an absolute concept of expressing the weight of a specific material in percentage based on the total weight. In the above-described mixture, the contents of material A, material B, and material C based on 100% of the total weight of the mixture are 50% by weight, 20% by weight, and 30% by weight, respectively. At this time, a sum of contents of respective components does not exceed 100% by weight.

The present invention may be variously modified and have various forms, and specific exemplary embodiments will be described and explained in detail below.

However, it is not intended to limit the present invention to the specific exemplary embodiments and it must be understood that the present invention includes every modifications, equivalents, or replacements included in the spirit and technical scope of the present invention.

Hereinafter, the present invention will be described in more detail.

According to one embodiment of the present invention, provided is a polyethylene which has excellent processability to be suitable for the manufacture of injection-molded products such as bottle caps, etc. by controlling a molecular weight distribution in the high molecular weight region and crystallization temperatures ($Tc_{10}$ and $Tc_{40}$) according to cooling rates, in order to reduce dependence on processing conditions, such as a cooling rate, etc., during injection, and to manufacture injection-molded products which are improved in hair defects.

Specifically, with regard to the polyethylene of the present invention, an integral value in the region where the Log Mw is 5.5 or more in a GPC curve of the polyethylene, wherein the x-axis is log Mw and the y-axis is dw/dlogMw, is 9% or less of the total integral value, and a ratio ($Tc_{10}/Tc_{40}$) of a crystallization temperature ($Tc_{10}$) measured at a cooling rate of 10° C./min to a crystallization temperature ($Tc_{40}$) measured at a cooling rate of 40° C./min is less than 1.04.

In particular, with regard to the polyethylene, a molecular weight distribution in the high molecular weight region and crystallization temperatures ($Tc_{10}$ and $Tc_{40}$) according to cooling rates are controlled by using a specific metallocene catalyst as described below, thereby reducing dependence on processing conditions, such as a cooling rate, etc., during injection, and effectively improving injection molding defects, particularly, hair defects.

Hereinafter, the polyethylene of the present invention will be described in more detail.

With regard to the polyethylene, an integral value in the region where the Log Mw is 5.5 or more in a GPC curve, wherein the x-axis is log Mw and the y-axis is dw/dlogMw, is 9% or less, or 5% to 9% of the total integral value.

Specifically, the integral value in the region where the Log Mw is 5.5 or more may be preferably 8.98% or less, or 8.95% or less, or 8.91% or less. However, considering substantial processability of the polyethylene, the integral value in the region where the Log Mw is 5.5 or more may be 5.5% or more, or 6% or more, or 7% or more, or 8% or more, or 8.3% or more.

When the polyethylene has the above-described integral value in the region where the Log Mw is 5.5 or more, its high molecular weight (or molecular weight) may be optimized, and its crystallization temperature (or processability) may be improved.

Further, with regard to the polyethylene, an integral value in the region where the Log Mw is 6.5 or more in a GPC curve, wherein the x-axis is log Mw and the y-axis is dw/dlogMw, is 0.3% or less, or 0.01% to 0.3% of the total integral value.

Specifically, the integral value in the region where the Log Mw is 6.5 or more may be preferably 0.28% or less, or 0.25% or less, or 0.23% or less. However, considering substantial processability of the polyethylene, the integral value in the region where the Log Mw is 6.5 or more may be 0.02% or more, or 0.05% or more, or 0.08% or more, or 0.1% or more, or 0.15% or more.

When the polyethylene has the above-described integral value in the region where the Log Mw is 6.5 or more, its ultra-high molecular weight (or molecular weight) may be optimized, and its crystallization temperature (or processability) may be improved.

Further, with regard to the polyethylene, a ratio (UH/H) of the integral value (UH Mw) in the region where the Log Mw is 6.5 or more to the integral value (H Mw) in the region where the Log Mw is 5.5 or more in a GPC curve, wherein the x-axis is log Mw and the y-axis is dw/dlogMw, may be 0.02 or more, or 0.02 to 0.03.

Specifically, the ratio (UH/H) of the integral value (UH Mw) in the region where the Log Mw is 6.5 or more to the integral value (H Mw) in the region where the Log Mw is 5.5 or more may be preferably 0.021 or more, or 0.0215 or more, or 0.022 or more. However, considering substantial processability of the polyethylene, the ratio (UH/H) of the integral value (UH Mw) may be 0.028 or less, or 0.026 or less, or 0.024 or less.

When the polyethylene has the above-described ratio (UH/H) of the integral value (UH Mw) in the region where the Log Mw is 6.5 or more to the integral value (H Mw) in the region where the Log Mw is 5.5 or more, a ratio of the high-molecular weight content of the polyethylene may be optimized, and the crystallization temperature may be improved.

As described above, the polyethylene of the present invention may exhibit the optimum ratio of the high molecular weight region in the molecular structure, and at the same time, an optimized molecular weight distribution (MWD, Mw/Mn).

Specifically, the polyethylene may have a molecular weight distribution (Mw/Mn) of 10 to 13, preferably 10.5 or more, or 11 or more, or 11.2 or more, and 12.5 or less, or 12.1 or less, or 11.9 or less.

When the polyethylene has the above-described molecular weight distribution (Mw/Mn), its molecular weight and molecular weight distribution may be optimized, and its crystallization temperature (or processability) may be improved.

For example, the ratio of the region where the Log Mw is 5.5 or more to the region where the Log Mw is 6.5 or more in the GPC curve and the molecular weight distribution (MWD, polydispersity index) are measured using gel permeation chromatography (GPC, manufactured by Waters).

Here, the molecular weight distribution (MWD, polydispersity index) may be calculated by measuring a weight average molecular weight (Mw) and a number average molecular weight (Mn) of the polyethylene and then dividing the weight average molecular weight by the number average molecular weight.

In detail, PL-GPC220 instrument manufactured by Waters may be used as the gel permeation chromatography (GPC) instrument, and a Polymer Laboratories PLgel MIX-B 300 mm length column may be used. At this time, an evaluation temperature may be 160° C., and 1,2,4-trichlorobenzene may be used as a solvent, and a flow rate of 1 mL/min may be applied. Each polyethylene sample may be pretreated by dissolving in 1,2,4-trichlorobenzene containing 0.0125% of butylated hydroxytoluene (BHT) at 160° C. for 10 hours using a GPC analyzer (PL-GP220), and the sample may be prepared at a concentration of 10 mg/10 mL and fed in an amount of 200 microliters (µL). Mw and Mn may be obtained using a calibration curve formed using polystyrene standard specimens. 9 kinds of the polystyrene standard specimens with a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol may be used.

Further, the polyethylene may have a weight average molecular weight of 90000 g/mol to 150000 g/mol, preferably, 95000 g/mol or more, or 100000 g/mol or more, or 105000 g/mol, or more, and 140000 g/mol or less, or 130000 g/mol or less, or 125000 g/mol or less, or 120000 g/mol or less.

When the polyethylene has the above-described weight average molecular weight (Mw), the molecular weight distribution of the polyethylene may be optimized, and processability may be improved.

Meanwhile, the polyethylene of the present invention is characterized in that the high molecular region ratio in the molecular structure is within the optimum range, as described above, and at the same time, the crystallization temperatures ($Tc_{10}$ and $Tc_{40}$) according to cooling rates are optimized.

With regard to the polyethylene, a ratio ($Tc_{10}/Tc_{40}$) of the crystallization temperature ($Tc_{10}$) measured at a cooling rate of 10° C./min to the crystallization temperature ($Tc_{40}$) measured at a cooling rate of 40° C./min is less than 1.04, or 1 or more to less than 1.04.

Specifically, the ratio ($Tc_{10}/Tc_{40}$) of the crystallization temperature ($Tc_{10}$) measured at a cooling rate of 10° C./min to the crystallization temperature ($Tc_{40}$) measured at a cooling rate of 40° C./min may be preferably 1.038 or less, or 1.035 or less, or 1.03 or less, or 1.028 or less, or 1.024 or less. However, considering substantial processability of the polyethylene, the ratio ($Tc_{10}/Tc_{40}$) of the crystallization temperature ($Tc_{10}$) measured at a cooling rate of 10° C./min to the crystallization temperature ($Tc_{40}$) measured at a cooling rate of 40° C./min may be 1 or more, or 1.01 or more, or 1.015 or more, or 1.017 or more.

When the polyethylene has the above-described ratio ($Tc_{10}/Tc_{40}$) of the crystallization temperature ($Tc_{10}$) measured at a cooling rate of 10° C./min to the crystallization temperature ($Tc_{40}$) measured at a cooling rate of 40° C./min, the crystallization temperature of the polyethylene may be optimized, and dependence on the processing rate may be reduced.

Further, with regard to the polyethylene, the crystallization temperature ($Tc_{40}$) measured at a cooling rate of 40° C./min is 113° C. to 114° C.

Specifically, with regard to the polyethylene, the crystallization temperature ($Tc_{40}$) measured at a cooling rate of 40° C./min may be preferably 113.2° C. or higher, or 113.5° C. or higher, or 113.7° C. or higher, and 113.95° C. or lower, or 113.9° C. or lower, or 113.8° C. or lower.

When the polyethylene has the above-described crystallization temperature ($Tc_{40}$) measured at a cooling rate of 40° C./min, the crystallization rate may be optimized during injection of the polyethylene, and processability may be improved.

Further, with regard to the polyethylene, the crystallization temperature ($Tc_{10}$) measured at a cooling rate of 10° C./min is 115° C. to 117° C.

Specifically, with regard to the polyethylene, the crystallization temperature ($Tc_{10}$) measured at a cooling rate of 10° C./min may be preferably 115.2° C. or higher, or 115.5° C. or higher, or 115.7° C. or higher, and 116.9° C. or lower, or 116.8° C. or lower, or 116.6° C. or lower.

When the polyethylene has the above-described crystallization temperature ($Tc_{10}$) measured at a cooling rate of 10° C./min, the crystallization rate of the polyethylene may be optimized, and processability may be improved.

In particular, factors involved in the hair generation include crystallization temperature (Tc), etc., and factors involved in the hair growth include viscosity, etc. The hair generation has been mainly solved by increasing viscosity through lowering the processing temperature. However, since the hair generation rate differs depending on various resins and characteristics of molds (mold temperature, cooling rate, etc.), there is a limit to solving the problem through control of the processing temperature. Therefore, the hair generation rate may be reduced by reducing dependence of the resin itself on processing conditions (cooling rate, etc.).

Further, the cooling rate in a practical process is faster than 100° C. per minute, and therefore, when the resin itself does not harden rapidly, the resin that does not harden is stretched, resulting in hair generation. For example, as the crystallization rapidly occurs at a high cooling rate of 100° C. per minute or more, the resin viscosity increases, and thus the dependence of hair generation thereon may be reduced. Accordingly, a ratio ($Tc_{10}/Tc_{40}$) of the crystallization temperature at a low rate (10° C./min) to the crystallization temperature at a high rate (40° C./min) is ultimately related to an increase in the hair generation rate under harsh process conditions, as compared to mild process conditions. Accordingly, by minimizing the above-described specific ratio ($Tc_{10}/Tc_{40}$) of the crystallization temperature at a low rate to the crystallization temperature at a high rate, it is possible to improve the hair generation rate in the practical process and to reduce the injection molding defect rate.

As described above, the polyethylene of the present invention may exhibit the optimum range of the crystallization temperatures ($Tc_{10}$ and $Tc_{40}$) according to the cooling rates, and at the same time, may exhibit optimized melting temperatures ($Tm_{10}$ and $Tm_{40}$).

With regard to the polyethylene, a ratio ($Tm_{10}/Tm_{40}$) of the melting temperature ($Tm_{10}$) measured at a heating rate of 10° C./min to the melting temperature ($Tm_{40}$) measured at a heating rate of 40° C./min may be 1.004 to 1.012.

Further, with regard to the polyethylene, the melting temperature ($Tm_{40}$) measured at a heating rate of 40° C./min may be 117° C. to 118° C.

Further, with regard to the polyethylene, the melting temperature ($Tm_{10}$) measured at a heating rate of 10° C./min may be 128° C. to 130° C.

For example, the crystallization temperatures ($Tc_{10}$, $Tc_{40}$) and the melting temperatures ($Tm_{10}$, $Tm_{40}$) may be measured using a differential scanning calorimeter (DSC).

In detail, a copolymer is heated to 200° C. and maintained for 3 minutes, and then cooled to 30° C., followed by increasing the temperature again. At this time, the heating rate is 10° C./min, and the cooling rate is controlled to 10° C./min and 40° C./min, respectively. The result measured in the second heating run is regarded as the melting temperature. The result measured in the cooling run is regarded as the crystallization temperature.

Meanwhile, with regard to the polyethylene of the present invention, the ratio of the high molecular weight region in the molecular structure and the crystallization temperatures ($Tc_{10}$ and Tc40) according to the cooling rates may be optimized, as described above, and at the same time, a melt index, a melt flow rate ratio, and a density may be also optimized.

Further, the polyethylene may have a melt index (ASTM D 1238, 190° C., 2.16 kg) of 0.2 to 2.0 g/10 min, preferably, 0.3 g/10 min or more, or 0.5 g/10 min or more, or 0.85 g/10 min or more, or 1.0 g/10 min or more, or 1.03 g/10 min or more, and 1.8 g/10 min or less, or 1.6 g/10 min or less, or 1.5 g/10 min or less, or 1.2 g/10 min or less, or 1.15 g/10 min or less, or 1.05 g/10 min or less.

When the polyethylene has the above-described melt index, the molecular weight of the polyethylene may be optimized and the crystallization temperature may be improved.

Further, the polyethylene may have a melt flow rate ratio (MFRR, $MI_5/MI_{2.16}$) of 3.5 to 4.0, preferably, 3.52 or more, or 3.54 or more, or 3.56 or more, or 3.58 or more, and 3.98 or less, or 3.95 or less, or 3.93 or less, or 3.91 or less.

The MFRR is a value obtained by dividing a melt index ($MI_5$) measured for the polyethylene at 190° C. under a load of 5 kg by a melt index ($MI_{2.16}$) measured at 190° C. under a load of 2.16 kg in accordance with ASTM D1238.

When the polyethylene has the above-described melt flow rate ratio, the molecular weight distribution of the polyethylene may be optimized and the crystallization temperature may be improved.

Further, the polyethylene may be a high-density polyethylene (HDPE) satisfying a density (ASTM D1505, 23° C.) of 0.945 $g/cm^3$ to 0.965 $g/cm^3$.

More specifically, the polyethylene may have a density of preferably 0.946 $g/cm^3$ or more, or 0.947 $g/cm^3$ or more, or 0.948 $g/cm^3$ or more, or 0.950 $g/cm^3$ or more, or 0.951 $g/cm^3$ or more, and 0.963 $g/cm^3$ or less, or 0.960 $g/cm^3$ or less, or 0.958 $g/cm^3$ or less, or 0.956 $g/cm^3$ or less.

The polyethylene according to one embodiment of the present invention may be a copolymer of a $C_{4-20}$ alpha-olefin monomer and ethylene.

For example, the alpha-olefin may include alpha-olefin having 4 to 20 carbon atoms, or 4 to 15 carbon atoms, or 4 to 12 carbon atoms, and specifically, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc. Among them, any one thereof or a mixture of two or more thereof may be included. Among them, the alpha-olefin may be more specifically 1-butene or 1-hexene, and much more specifically, 1-butene.

More specifically, the polyethylene according to one embodiment of the present invention may be a copolymer of ethylene and 1-butene.

Further, the alpha-olefin-derived repeating unit may be included in an amount of about 0.2 mol % to about 5 mol % in the polyethylene. When the alpha-olefin-derived repeating unit is included in the above-described range, the polyethylene may exhibit superior processability. However, when the content of the alpha-olefin-derived repeating unit is as low as less than 0.2 mol %, it is difficult to obtain the effect of improving processability due to the alpha-olefin-derived repeating unit, and when the content is more than 5 mol %, the effect of improving life may be deteriorated. Considering the effect of improving processability according to control of the content of the alpha-olefin-derived repeating unit, the alpha-olefin-derived repeating unit may be more preferably included in an amount of 0.5 mol % or more, or 1 mol % or more, or 1.2 mol % or more, or 1.5 mol % or more, or 1.8 mol % or more, or 2 mol % or more, and 4.8 mol % or less, or 4.5 mol % or less, or 4.2 mol % or less, or 4 mol % or less, or 3.8 mol % or less, or 3.5 mol % or less, based on the total weight of the polyethylene.

Meanwhile, as used herein, the 'hair', which is a type of processing defects that occur during injection molding processes, refers to a phenomenon in which an injection-molded resin is stretched long near a gate, through which the molten resin or injection-molded resin is passed or transported, or inflow or outflow thereof occurs, in an injection molding system during injection molding. In the present invention, when the length of the stretched polyethylene is 2.5 mm or more by carrying out injection molding using 1.6 g to 2.4 g of the polyethylene under conditions of a holding pressure of 300 bar to 1000 bar, a holding time of 0.5 seconds to 2.0 seconds, a cooling time of 0.5 seconds to 3.0 seconds, an injection temperature of 190° C. to 250° C., an injection speed of 50 mm/s to 100 mm/s, a plasticizing length of 6 mm to 25 mm, and a back pressure of 5 bar to 100 bar, the stretched polyethylene is expressed as hair or floss, which may be one of injection molding defects.

Further, as used herein, the 'hair generation rate' is a ratio of the number of injection-molded products having hairs to the total number of injection-molded products, the ratio expressed as a percentage, when the polyethylene resin is injection-molded under injection molding conditions of a holding pressure of 300 bar to 1000 bar, a holding time of 0.5 seconds to 2.0 seconds, a cooling time of 0.5 seconds to 3.0 seconds, an injection temperature of 190° C. to 250° C., an injection speed of 50 mm/s to 100 mm/s, a plasticizing length of 6 mm to 25 mm, and a back pressure of 5 bar to 100 bar. For example, when 20 kg of the polyethylene resin is molded into a bottle cap (top plate: 1.0 mm in thickness) of PC01881 standard under the above-described conditions, the hair generation rate is a ratio of the number of injection-molded products having hairs to the total number of the manufactured injection-molded products, the ratio expressed as a percentage.

Specifically, the hair generation rate may be defined and calculated by the following Equation 1:

Hair generation rate(%)=[$B/A$]×100     [Equation 1]

In Equation 1, A represents the total number of the manufactured injection-molded products, when the polyethylene resin is molded, specifically, 20 kg of the polyethylene resin is molded into a bottle cap (top plate: 1.0 mm in thickness) of PC01881 standard under injection molding conditions of a holding pressure of 300 bar to 1000 bar, a holding time of 0.5 seconds to 2.0 seconds, a cooling time of 0.5 seconds to 3.0 seconds, an injection temperature of 190° C. to 250° C., an injection speed of 50 mm/s to 100 mm/s, a plasticizing length of 6 mm to 25 mm, and a back pressure of 5 bar to 100 bar, and B represents the number of injection-molded products having hairs in the injection-molded products manufactured by injection molding under the above-described conditions.

In particular, when injection-molded, the polyethylene of the present invention may have a hair generation rate of 5% or less, or 0.001% to 5% or less, as calculated according to Equation 1.

Specifically, when injection-molded, the polyethylene of the present invention may have a hair generation rate of preferably 4.8% or less, or 4.5% or less, or 4% or less, or 3.5% or less, or 3% or less, or 2.5% or less. However, considering substantial processability during the injection molding process, the polyethylene of the present invention may have a hair generation rate of 0.005% or more, or 0.01% or more, or 0.015% or more, or 0.02% or more, or 0.05% or more, or 0.1% or more, when injection-molded.

When the polyethylene has the above-described hair generation rate during injection-molding, the injection molding defect rate of the polyethylene may be optimized, and processability may be improved.

Meanwhile, according to another embodiment of the present invention, provided is a method of preparing the above-described polyethylene.

Specifically, the polyethylene is prepared by a method of polymerizing an olefin monomer in the presence of a catalyst composition including a metallocene compound represented by the following Chemical Formula 1:

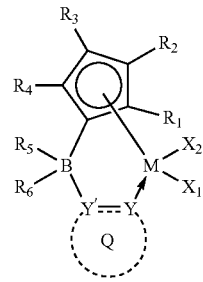

[Chemical Formula 1]

in Chemical Formula 1,

B is boron,

M is a Group 4 transition metal, $R_1$ to $R_4$ are each independently hydrogen, $C_{1-20}$ alkyl, $C_{3-20}$ cycloalkyl, or $C_{6-20}$ aryl, or $R_1$ and $R_2$ or $R_3$ and $R_4$ are connected to each other to form a substituted or unsubstituted $C_{6-60}$ aromatic ring, $R_5$ and $R_6$ are each independently $C_{1-20}$ alkyl, $C_{3-20}$ cycloalkyl, or $C_{6-20}$ aryl, or $R_5$ and $R_6$ are connected to each other to form a $C_{3-60}$ aliphatic ring or a $C_{6-60}$ aromatic ring, $X_1$ and $X_2$ are each independently $C_{1-20}$ alkyl or —O(CO)R', wherein R' is $C_{1-20}$ alkyl, Q is a substituted or unsubstituted C2-60 hetero ring including any one or more selected from the group consisting of N, O, and S, Y and Y' are elements constituting Q, Y is N, O, or S, Y' is an element of Q, and is adjacent to Y, and is N or C.

The above substituents are more specifically explained as follows.

In the specification, the following terms may be defined as follows unless specifically limited.

The halogen may be fluorine (F), chlorine (Cl), bromine (Br), or iodine (I).

The alkyl may be linear or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, the $C_{1-20}$ alkyl may be a methyl group, an ethyl group, an n-propyl group, an iso-propyl group, an n-butyl group, an iso-butyl group, a tert-butyl group, an n-pentyl group, an iso-pentyl group, etc., but is not limited thereto. Meanwhile, in the present specification, "iPr" means an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, the cycloalkyl may be cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, etc., but is not limited thereto. Meanwhile, in the present specification, "Cy" means cycloalkyl having 3 to 6 carbon atoms.

The alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl, or $C_5$-10 cyclic alkenyl. More specifically, the $C_{2-20}$ alkenyl may be ethenyl, a propenyl, a butenyl, a pentenyl, or a cyclohexenyl, etc.

The alkoxy may be linear, branched, or cyclic alkoxy. Specifically, the $C_{1-20}$ alkoxy may be $C_{1-20}$ linear alkoxy;

$C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, or cycloheptoxy, etc., but is not limited thereto.

The alkoxyalkyl has a structure including —Ra—O—Rb, and may be a substituent in which one or more hydrogens of alkyl(—Ra) are substituted with alkoxy(—O—Rb). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, etc., but is not limited thereto.

The aryl includes monocyclic, bicyclic, or tricyclic aromatic hydrocarbons. According to one embodiment of the present invention, the aryl may have 6 to 60 carbon atoms or 6 to 20 carbon atoms, and the aryl may be specifically phenyl, naphthyl, anthracenyl, dimethylanilinyl, anisolyl, etc., but is not limited thereto.

The heteroaryl is heteroaryl including one or more of N, O, and S as a heteroatom, and the number of carbon atoms may be, but is not particularly limited to, 2 to 60 or 2 to 20. Examples of the heteroaryl may include xanthene, thioxanthen, thiophene, furan, pyrrole, imidazole, thiazole, oxazole, oxadiazole, triazole, pyridyl, bipyridyl, pyridinyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, etc., but are not limited thereto.

The hydrocarbyl group means a monovalent hydrocarbon compound, and includes an alkyl group, an alkenyl group, an alkynyl group, an aryl group, an aralkyl group, an aralkenyl group, an aralkynyl group, an alkylaryl group, an alkenylaryl group, an alkynylaryl group, etc. For example, the hydrocarbyl group may be linear, branched, or cyclic alkyl. More specifically, the hydrocarbyl group having 1 to 30 carbon atoms may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as phenyl, biphenyl, naphthyl, anthracenyl, phenanthrenyl, fluorenyl, etc. Moreover, it may be alkylaryl such as methylphenyl, ethylphenyl, methylbiphenyl, methylnaphthyl, etc., or arylalkyl such as phenylmethyl, phenylethyl, biphenylmethyl, naphthylmethyl, etc. It may also be alkenyl such as allyl, ethenyl, propenyl, butenyl, pentenyl, etc.

The hetero ring includes all of aliphatic rings including any one or more selected from the group consisting of N, O, and S, and aromatic rings including any one or more selected from the group consisting of N, O, and S.

Further, the Group 4 transition metal may be titanium (Ti), zirconium (Zr), hafnium (Hf), or rutherfordium (Rf), specifically, titanium (Ti), zirconium (Zr), or hafnium (Hf), and more specifically, zirconium (Zr) or hafnium (Hf), but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; amino; silyl; alkylsilyl or alkoxysilyl; phosphine; phosphide; sulfonate; and sulfone.

As the metallocene catalyst for ethylene polymerization of the present invention, a catalyst precursor including one or more metallocene compounds represented by Chemical Formula 1 may be used.

The metallocene compound represented by Chemical Formula 1 employs a bridge structure including a boron anion, unlike a constrained geometry catalyst (CGC)-type precursor commonly used. The traditional CGC-type precursor has a neutral bridge structure including silicon so that the ligand unit is negatively charged. Due to a structural limitation caused thereby, there is a problem in that it is difficult to achieve various physical properties during preparation of olefin polymers.

In contrast, the metallocene compound represented by Chemical Formula 1 according to the present invention may have a neutral ligand unit because the bridge structure is negatively charged. The ligand unit of the present invention is the hetero ring Q of Chemical Formula 1, wherein Y as an element of Q coordinates with a metal, and Y', as an element of Q, adjacent to Y is connected to the bridge. Accordingly, in the present invention, by employing various neutral ligand units satisfying the above structure, it is possible to prepare a catalyst having higher activity and higher copolymerizability than the existing CGC precursors.

In addition, alkyl or carboxylate is included as a metal substituent of the metallocene compound represented by Chemical Formula 1, which acts as a good leaving group to promote a reaction with a cocatalyst such as MAO, etc., resulting in improvement of activity.

Therefore, when the metallocene compound is used, the high melt index of polyethylene may be maintained, the low-molecular-weight component may be reduced, the molecular weight distribution may be narrow, and the SCB content may be increased to increase the effective number of physical cross-links of molecules, thereby preparing a polyethylene having reduced generation of total volatile organic compounds (TVOCs).

Specifically, in Chemical Formula 1, M may be zirconium (Zr).

Further, in Chemical Formula 1, $R_1$ to $R_4$ are each independently hydrogen, $C_{1-10}$ alkyl or $C_{6-20}$ aryl, and $R_1$ and $R_2$ or $R_3$ and $R_4$ are connected to each other to form a substituted or unsubstituted $C_{6-20}$ aromatic ring. Preferably, $R_1$ to $R_4$ are each independently hydrogen, or methyl, or $R_1$ and $R_2$ or $R_3$ and $R_4$ are connected to each other to form a benzene ring or a 1,2,3,4-tetrahydronaphthalene ring, wherein the benzene ring or the 1,2,3,4-tetrahydronaphthalene ring may be unsubstituted or substituted with one substituent to four substituents selected from the group consisting of methyl, tert-butyl, and 4-tert-butyl phenyl.

Further, in Chemical Formula 1, $R_5$ and $R_6$ are each independently $C_{1-10}$ alkyl, or $C_{6-20}$ aryl, or $R_5$ and $R_6$ are connected to each other to form a $C_{3-20}$ aliphatic ring or a C6-aromatic ring. Preferably, $R_5$ and $R_6$ are each independently methyl or phenyl, or $R_5$ and $R_6$ are connected to each other to form a cyclooctane ring.

More preferably, $R_5$ and $R_6$ may be each phenyl.

Further, in Chemical Formula 1, $X_1$ and $X_2$ may be each independently methyl or acetate.

Further, in Chemical Formula 1, R' may be methyl.

Further, in Chemical Formula 1, $X_1$ and $X_2$ may be the same as each other.

Further, in Chemical Formula 1, Q may be a substituted or unsubstituted $C_{2-20}$ hetero ring including any one or more selected from the group consisting of N, O, and S.

Preferably, Q may be a pyridine ring, a quinoline ring, a 4,5-dihydrooxazole ring, a pyrazole ring, or a benzoxazole ring, wherein Q is unsubstituted or substituted with one substituent to four substituents selected from the group consisting of methyl, isopropyl, and diphenylamino.

More preferably, Q may be a pyridine ring, a 4,5-dihydrooxazole ring, a pyrazole ring, or a benzoxazole ring, wherein Q is unsubstituted or substituted with one substituent to four substituents selected from the group consisting of methyl, isopropyl, and diphenylamino.

Further, in Chemical Formula 1, Y is a hetero atom coordinating with the metal M, and preferably, Y may be N.

Meanwhile, specific examples of the second metallocene compound represented by Chemical Formula 1 may include compounds represented by the following structural formulae, but the present invention is not limited thereto:

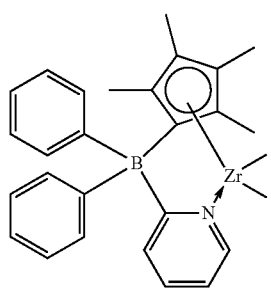

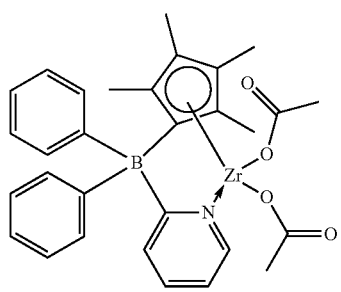

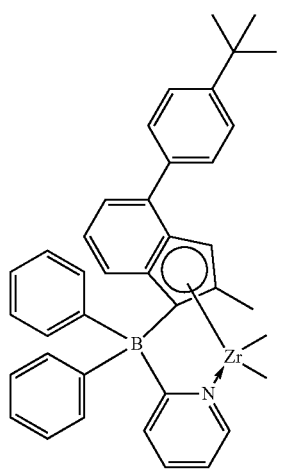

-continued

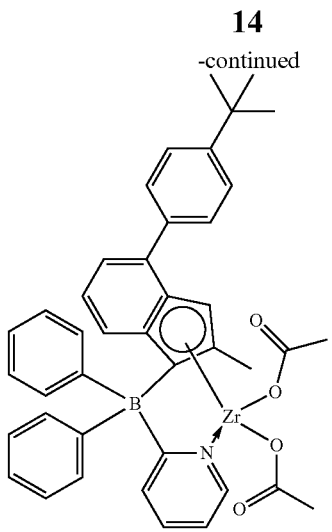

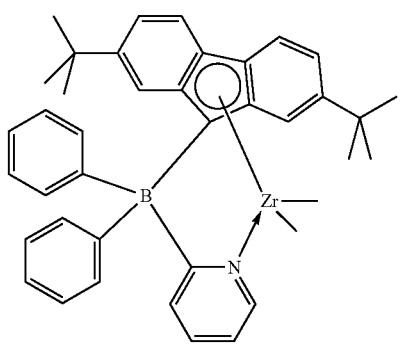

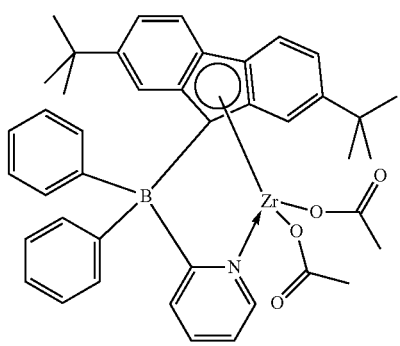

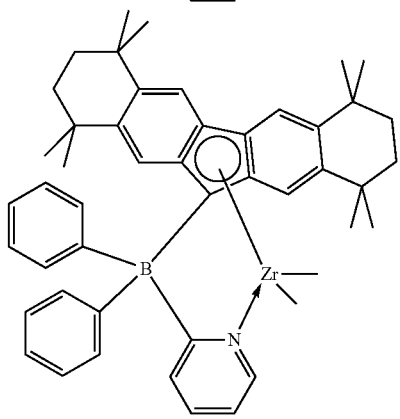

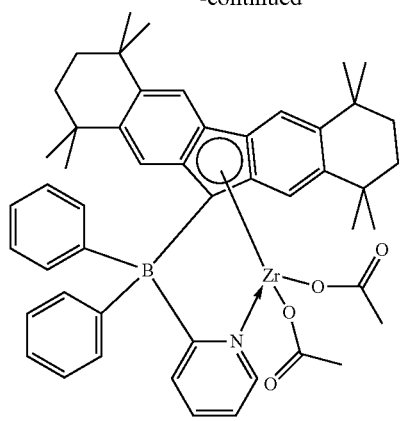
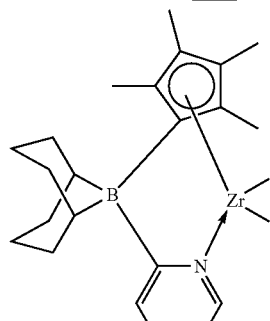
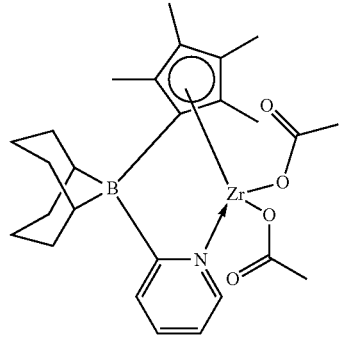
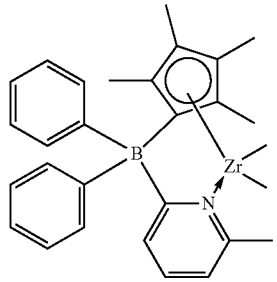
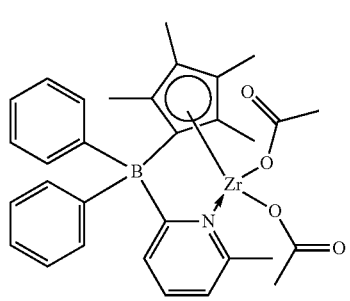
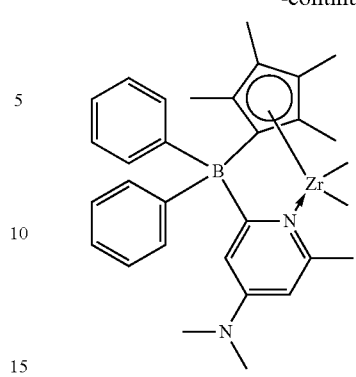
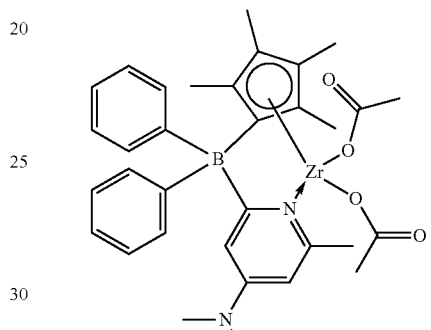
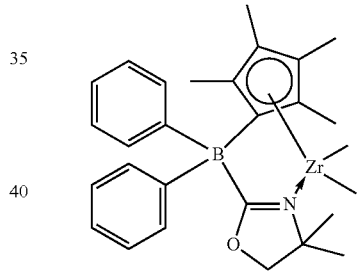
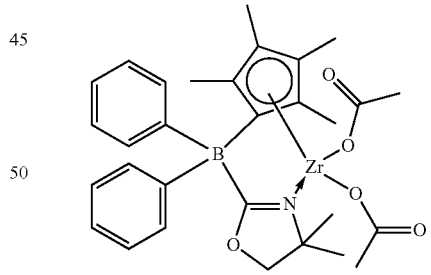
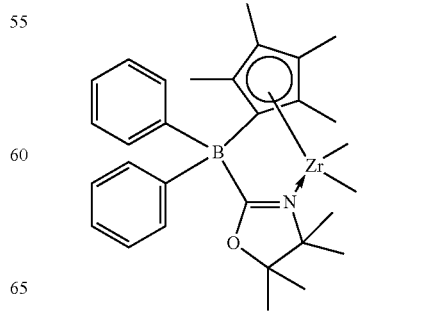

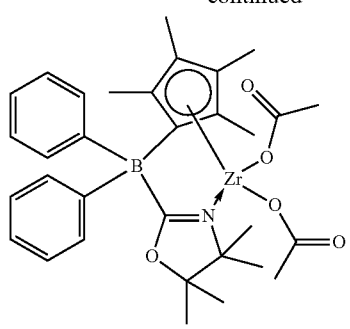
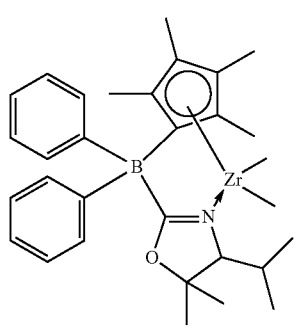
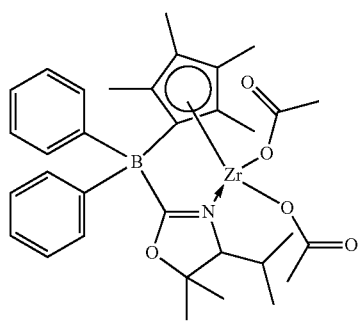
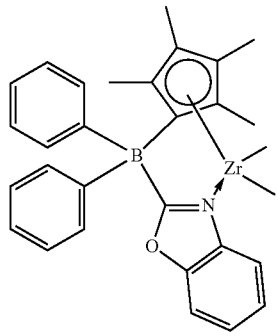
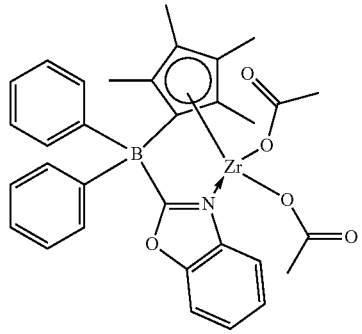
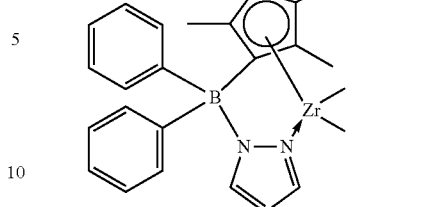
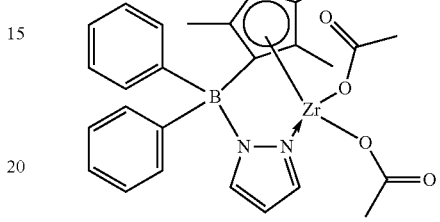
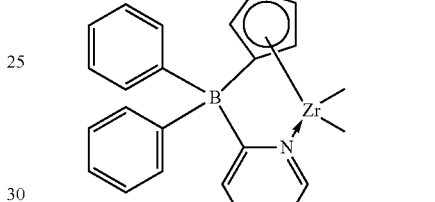
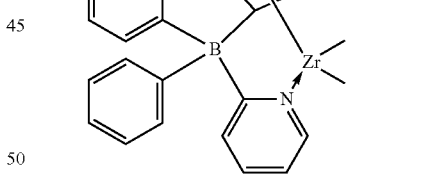
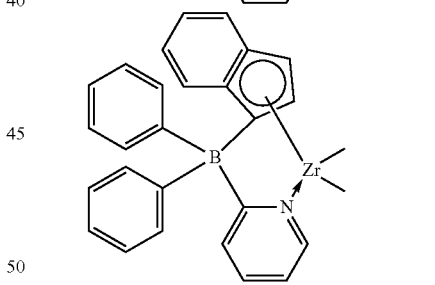
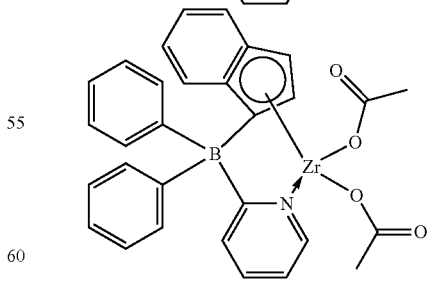
The metallocene compound represented by Chemical Formula 1 may be prepared by a preparation method, for example, as in the following Reaction Scheme 1, when $X_1$ and $X_2$ are the same as each other, but is not limited thereto, and it may be prepared according to known methods of preparing an organic compound and a metallocene compound. The preparation method will be more embodied in Preparation Example to be described later.

[Reaction Scheme 1]

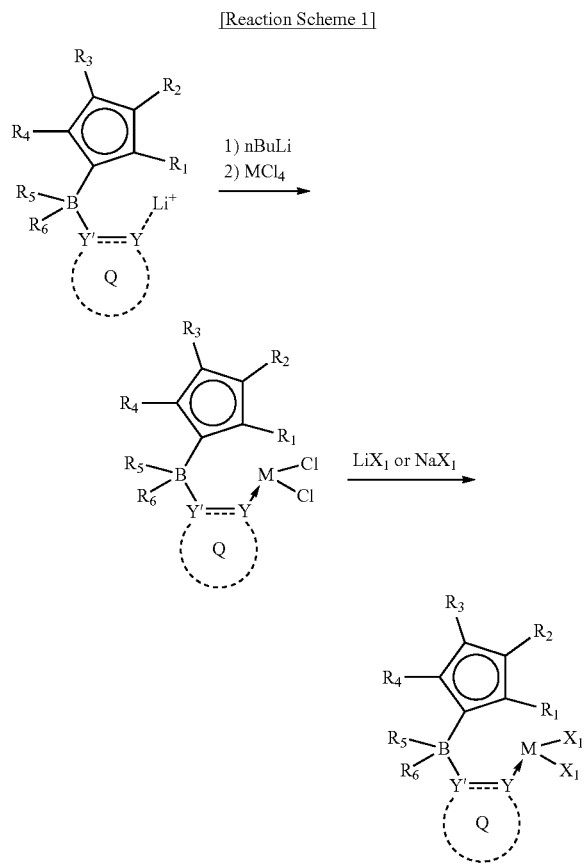

In Reaction Scheme 1, B, M, $R_1$ to $R_6$, $X_1$, $X_2$, Q, Y and Y' are the same as defined in Chemical Formula 1.

Meanwhile, in the present specification, equivalent (eq.) means molar equivalent.

The catalyst composition according to one embodiment of the present invention may include the metallocene compound of Chemical Formula 1 as a single catalyst.

In this regard, the catalyst composition may include the metallocene compound as a single component, or may be in the form of a supported metallocene catalyst including the metallocene compound and a support. When the supported metallocene catalyst is used, it is possible to improve morphology and physical properties of the polyethylene to be prepared, and it may be appropriately used in the traditional slurry polymerization, bulk polymerization, and gas phase polymerization processes.

Specifically, as the support, a support having a highly reactive hydroxyl group, silanol group, or siloxane group on the surface thereof may be used. To this end, those surface-modified by calcination, or those in which moisture is removed from the surface thereof by drying may be used. For example, silica prepared by calcination of silica gel, silica dried at a high temperature, silica-alumina, and silica-magnesia may be used. These may commonly include oxides, carbonates, sulfates, and nitrates, such as $Na_2O$, $K_2CO_3$, $BaSO_4$, and $Mg(NO_3)_2$, etc.

The support may be calcined or dried at a temperature of about 200° C. to 600° C. or about 250° C. to 600° C. When the calcination or drying temperature for the support is low, too much moisture remains in the support, and thus it is apprehended that the moisture on the surface may react with the cocatalyst. In addition, a cocatalyst supporting ratio may be relatively high due to excess hydroxyl groups, but this requires a large amount of the cocatalyst. When the drying or calcination temperature is too high, pores on the surface of the support may be combined with each other to reduce surface area, and many hydroxyl groups or silanol groups may be lost from the surface, leaving only siloxane groups. Thus, it is apprehended that reactive sites with the cocatalyst may be reduced.

The amount of the hydroxyl groups on the support surface is preferably 0.1 mmol/g to 10 mmol/g, and more preferably 0.5 mmol/g to 5 mmol/g. The amount of the hydroxyl groups on the support surface may be controlled by a preparation method of the support and preparation conditions, or drying conditions, for example, temperature, time, vacuum or spray drying, etc.

When the amount of hydroxyl groups is less than 0.1 mmol/g, reactive sites with the cocatalyst may be reduced. When the amount of hydroxyl groups is more than 10 mmol/g, it may be caused by moisture besides the hydroxyl groups present on the surface of support particles, which is not desirable.

For example, the amount of hydroxyl groups on the support surface may be 0.1 mmol/g to 10 mmol/g or 0.5 mmol/g to 5 mmol/g. The amount of the hydroxyl groups on the support surface may be controlled by a preparation method of the support and preparation conditions, or drying conditions, for example, temperature, time, vacuum or spray drying, etc. When the amount of hydroxyl groups is too small, reactive sites with the cocatalyst may be reduced. When the amount of hydroxyl groups is too large, it may be caused by moisture besides the hydroxyl groups present on the surface of support particles.

Among the above-mentioned supports, the silica prepared by calcining silica, particularly, silica gel, has little catalyst released from the surface of the support in the polymerization process of the propylene, because the functional group of the compound of Chemical Formula 1 is chemically bound to and supported on the silica support. As a result, when the polyethylene is prepared by slurry or gas-phase polymerization, a fouling phenomenon, in which polymer particles stick to the wall surface of the reactor or with each other, may be minimized.

In addition, when supported on the support, the compound of Chemical Formula 1 may be supported in an amount of about 10 μmol or more, or about 30 μmol or more, and about 100 μmol or less, or about 80 μmol or less, based on the weight of the support, e.g., about 1 g of silica. When supported within the above content range, the supported catalyst may exhibit appropriate activity, which is advantageous in terms of maintaining catalytic activity and economic feasibility.

The catalyst composition may further include one or more cocatalysts together with the above-described metallocene compound and support.

Any cocatalyst may be used as the cocatalyst, as long as it may be used in the polymerization of olefin in the presence of a general metallocene catalyst. Such a cocatalyst allows binding between the hydroxyl groups on the support and a Group 13 transition metal. In addition, since the cocatalyst exists only on the surface of the support, it may contribute to securing the unique properties of the specific hybrid catalyst composition of the present application without a fouling phenomenon in which the polymer particles stick to the wall surface of the reactor or with each other.

Further, the catalyst composition according to the present invention may include one or more cocatalyst compounds selected from the group consisting of compounds represented by the following Chemical Formulae 2 to 4, in addition to the metallocene compound:

$$—[Al(R_{10})—O]a— \quad \text{[Chemical Formula 2]}$$

in Chemical Formula 2, $R_{10}$ is halogen; or $C_{1-20}$ hydrocarbyl substituted or unsubstituted with halogen; and a is an integer of 2 or more, $$D(R_{11})_3 \quad \text{[Chemical Formula 3]}$$

in Chemical Formula 3,

D is aluminum or boron; and $R_{11}$ is halogen; or $C_{1-20}$ hydrocarbyl substituted or unsubstituted with halogen, $$[L-H]^+[ZA_4]^- \text{ or} [L]^+[ZA_4]^- \quad \text{[Chemical Formula 4]}$$

in Chemical Formula 4,

L is a neutral or cationic Lewis base;

H is a hydrogen atom;

Z is a group 13 element; and

A's are each independently $C_{6-20}$ aryl or $C_{1-20}$ alkyl, of which one or more hydrogen atoms are substituted with halogen, $C_{1-20}$ hydrocarbyl, $C_{1-20}$ alkoxy, or phenoxy.

Specifically, in Chemical Formula 4, $[L-H]^+$ is a Bronsted acid.

The compound represented by Chemical Formula 2 may serve as an alkylating agent and an activating agent, the compound represented by Chemical Formula 3 may serve as an alkylating agent, and the compound represented by Chemical Formula 4 may serve as an activating agent.

The compound represented by Chemical Formula 2 is not particularly limited as long as it is alkylaluminoxane, and it may be, for example, methylaluminoxane, ethylaluminoxane, isobutylaluminoxane, butylaluminoxane, etc., and preferably, methylaluminoxane.

The compound represented by Chemical Formula 3 is not particularly limited, as long as it is an alkyl metal compound, and it may be, for example, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and it may be preferably selected from trimethylaluminum, triethylaluminum, and triisobutylaluminum.

Examples of the compound represented by Chemical Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, etc. Preferably, aluminoxane may be used, and more preferably, methylaluminoxane (MAO) which is alkylaluminoxane may be used.

Further, the catalyst composition may include the cocatalyst and the metallocene compound of Chemical Formula 1 at a molar ratio of about 1:1 to about 1:10000, and preferably, at a molar ratio of about 1:1 to about 1:1000, and more preferably, at a molar ratio of about 1:10 to about 1:100. In this regard, when the molar ratio is less than about 1, the metal content of the cocatalyst is too small and thus the catalyst active species is not well formed, and as a result, the activity may be lowered. When the molar ratio is more than about 10000, the metal of the cocatalyst may act as a catalyst poison.

The supporting amount of the cocatalyst may be about 3 mmol to about 25 mmol, or about 5 mmol to about 20 mmol, based on 1 g of the support.

Meanwhile, the catalyst composition may be prepared by a method of preparing the catalyst composition including the support on which the cocatalyst and the metallocene compound are supported, the method including the steps of supporting the cocatalyst on the support; and supporting the metallocene compound on the support on which the cocatalyst has been supported.

In the method, the supporting conditions are not particularly limited, and the supporting may be performed within the range well-known to those skilled in the art. For example, high-temperature supporting and low-temperature supporting may be appropriately performed, and the supporting temperature may be, for example, in the range of about −30° C. to about 150° C., preferably about 50° C. to about 98° C., or about 55° C. to about 95° C. The supporting time may be appropriately controlled depending on the amount of a first metallocene compound to be supported. The supported catalyst thus reacted may be used as it is after removing the reaction solvent by filtration or distillation under reduced pressure, and if necessary, it may be used after soxhlet filtering with aromatic hydrocarbon such as toluene.

In addition, the preparation of the supported catalyst may be carried out in the presence or absence of a solvent. When a solvent is used, applicable solvents may include aliphatic hydrocarbon solvents such as hexane or pentane, aromatic hydrocarbon solvents such as toluene or benzene, hydrocarbon solvents substituted with a chlorine atom such as dichloromethane, ether solvents such as diethyl ether or tetrahydrofuran (THF), organic solvents such as acetone, ethylacetate, etc. Hexane, heptane, toluene, or dichloromethane is preferred.

Meanwhile, the polyethylene according to one embodiment of the present invention may be prepared by a method of preparing polyethylene, the method including the step of polymerizing polyethylene in the presence of the catalyst composition including the metallocene compound.

The method of preparing polyethylene may be carried out by a slurry polymerization method using ethylene and alpha-olefin as raw materials in the presence of the above-described catalyst composition and by applying a common apparatus and contact technology.

The method of preparing the polyethylene may copolymerize ethylene and alpha-olefin using a continuous slurry polymerization reactor, a loop slurry reactor, etc., but is not limited thereto.

In addition, the alpha-olefin may include alpha-olefin having 4 to 20 carbon atoms, or 4 to 15 carbon atoms, or 4 to 12 carbon atoms, and specifically, the alpha-olefin may be one or more selected from the group consisting of 1-butene, 1-pentene, 1-hexene, 4-methyl-1-pentene, 1-octene, 1-decene, 1-dodecene, 1-tetradecene, 1-hexadecene 1-octadecene, 1-eicocene, etc. Among them, any one thereof or a mixture of two or more thereof may be used.

Specifically, in the method of preparing the polyethylene, for example, 1-butene or 1-hexene may be used as the alpha-olefin. More specifically, 1-butene may be used.

For example, the copolymerization step may be performed by reacting about 0.002 mole to about 0.05 mole of alpha-olefin, based on 1 mole of ethylene. When the reaction is allowed in the above range, polyethylene may exhibit superior processability.

However, when alpha-olefin is reacted in an amount of less than 0.002 mole, it is difficult to obtain the effect of improving processability due to the alpha-olefin-derived repeating unit, and when the amount is more than 0.05 mole, the effect of improving life may be deteriorated. Considering the effect of improving processability according to control of the content of the alpha-olefin-derived repeating unit, the alpha-olefin may be more preferably reacted in an amount of 0.005 mole or more, or 0.01 mole or more, or 0.012 mole or more, or 0.015 mole or more, or 0.018 mole or more, or 0.02 mole, and 0.048 mole or less, or 0.045 mole or less, or 0.042 mole or less, or 0.04 mole or less, or 0.038 mole or less, or 0.035 mole or less, based on 1 mole of the ethylene.

Further, the polymerization temperature may be about 25° C. to about 500° C., or about 25° C. to about 300° C., or about 30° C. to about 200° C., or about 50° C. to about 150° C., or about 60° C. to about 120° C. Further, the polymerization pressure may be about 1 kgf/cm$^2$ to about 100 kgf/cm$^2$, or about 1 kgf/cm$^2$ to about 50 kgf/cm$^2$, or about 5 kgf/cm$^2$ to about 45 kgf/cm$^2$, or about 10 kgf/cm$^2$ to about 40 kgf/cm$^2$, or about 15 kgf/cm$^2$ to about 35 kgf/cm$^2$.

The catalyst composition including the metallocene compound of Chemical Formula 1 according to the present invention may be injected after being dissolved or diluted in an aliphatic hydrocarbon solvent having 5 to 12 carbon atoms, for example, pentane, hexane, heptane, nonane, decane, and isomers thereof, and an aromatic hydrocarbon solvent such as toluene and benzene, or a hydrocarbon solvent substituted with a chlorine atom such as dichloromethane and chlorobenzene. The solvent used herein is preferably used after removing a small amount of water or air, which acts as a catalyst poison, by treating with a small amount of alkyl aluminum. It is possible to further use the cocatalyst.

For example, the polymerization step may be performed by injecting about 900 ppm or less, or about 0 ppm to about 900 ppm of hydrogen gas, based on the amount of ethylene.

Specifically, the hydrogen gas may be injected in an amount of about 800 ppm or less, or about 750 ppm or less, or about 700 ppm or less, or about 650 ppm or less, or about 600 ppm or less, or about 550 ppm or less, or about 500 ppm or less, or about 450 ppm or less, based on the amount of ethylene. However, in terms of securing superior processability when the polyethylene is manufactured into an injection-molded product, the hydrogen gas may be injected in an amount of about 15 ppm or more, or about 30 ppm or more, or about 50 ppm or more, or about 100 ppm or more, or about 150 ppm or more, or about 180 ppm or more, or about 200 ppm or more, or about 220 ppm or more, or about 250 ppm or more, or about 270 ppm or more, or about 285 ppm or more, or about 300 ppm or more, or about 320 ppm or more, or about 330 ppm or more, or about 340 ppm or more.

Specifically, the above-described method of preparing the polyethylene may include the step of copolymerizing ethylene and $C_4$-20 alpha-olefin in the presence of the catalyst composition including the metallocene compound represented by Chemical Formula 1 while injecting hydrogen, wherein the hydrogen may be injected in an amount of 0.015 g/hr to 9 g/hr, or 0.02 g/hr to 7 g/hr, or 0.3 g/hr to 5 g/hr, or 0.5 g/hr to 3.4 g/hr, based on 10 kg/hr of the ethylene monomer, and the alpha-olefin may be injected in an amount of 0.1 to 8.0 mL/min, or 2 to 7.0 mL/min, or 3.5 to 6.5 mL/min, or 4 to 6 mL/min, based on 10 kg/hr of the ethylene monomer.

In such a process of copolymerizing ethylene, the catalyst composition including the metallocene compound of the present invention may exhibit high catalytic activity. For example, during ethylene copolymerization, the catalytic activity may be about 4.0 kg PE/g·cat·hr or more, or about 4.0 kg PE/g·cat·hr to about 50 kg PE/g·cat·hr, when calculated as a ratio of the weight (kg PE) of the produced polyethylene per the weight (g) of the catalyst composition used, based on the unit time (hr). Specifically, the activity of the catalyst composition may be about 4.2 kg PE/g·cat·hr or more, or about 4.3 kg PE/g·cat·hr or more, or about 4.5 kg PE/g·cat·hr or more, or about 40 kg PE/g·cat·hr or less, or about 30 kg PE/g·cat·hr or less, or about 15 kg PE 10/g·cat·hr or less.

As described above, according to the present invention, polyethylene may be prepared by copolymerizing ethylene and alpha-olefin using the catalyst composition including the metallocene compound of Chemical Formula 1 described above.

In this regard, the prepared polyethylene may be a copolymer of ethylene and 1-butene.

The method of preparing the polyethylene may provide a polyethylene having excellent physical properties by performing slurry polymerization in the presence of the above-described catalyst composition.

In particular, the catalyst composition including the metallocene compound of Chemical Formula 1 according to the present invention may exhibit high activity as described above during copolymerization of ethylene and alpha-olefin, and may increase the content of short chain branch (SCB) in the molecule together with a high molecular weight without excessively increasing the content of the alpha-olefin comonomer.

The polyethylene of the present invention, which is prepared by the above-described method of one embodiment, may reduce dependence on processing conditions, such as cooling rate, etc., during injection, and may improve injection molding defects, particularly, hair defects by optimizing a molecular weight distribution in the high molecular weight region and crystallization temperatures ($Tc_{10}$ and Tc40)

according to cooling rates, and therefore, the polyethylene may be appropriately applied to injection-molded products such as bottle caps, etc.

According to another embodiment of the present invention, provided is an injection-molded product including the polyethylene resin composition prepared by the above-described preparation method of one embodiment.

In particular, according to the present invention, when the polyethylene resin composition prepared by the above-described method is used, it is possible to manufacture an injection-molded product having excellent physical and chemical properties, such as bottle caps, etc., even though applying a relatively low injection pressure of 1000 bar to 1500 bar or 1200 bar to 1480 bar.

Further, such an injection-molded product may exhibit excellent physical and chemical properties, together with excellent injection processability at a low injection pressure.

More specifically, the injection-molded product may exhibit excellent ESCR properties, when the polyethylene resin composition prepared by the above-described method of one embodiment is manufactured into the injection-molded product in the form of bottle cap by injection and continuous compression molding (CCM). More specifically, the ESCR properties may be evaluated by exposing the injection-molded product in the form of bottle cap to 5% by weight of IGEPAL solution at a temperature of 42° C., by applying a pressure of 5 bar thereto, and then by measuring the time when a crack is formed. The ESCR properties of the injection-molded product, thus observed in the evaluation results, may be 18 hours or more, or 30 hours or more, or 40 hours to 145 hours, or 50 hours to 130 hours, indicating excellent chemical properties.

Such an injection-molded product may be represented by a lightweight bottle cap, as well as various injection-molded products.

Meanwhile, the above-described injection-molded product of another embodiment may be manufactured by a common injection method, except that the polyethylene resin composition prepared by the method of one embodiment is applied, and a relatively low injection pressure is applied. A further description thereof will be omitted.

Hereinafter, preferred exemplary embodiments are provided for better understanding of the present invention. However, the following exemplary embodiments are provided only for understanding the present invention more easily, but the content of the present invention is not limited thereby.

EXAMPLE

[Preparation of Catalyst Precursor]

Synthesis Example 1

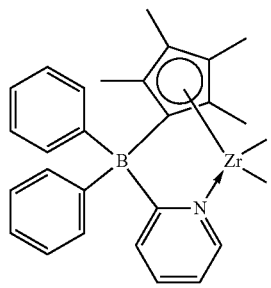

2-Bromopyridine (1 eq.) was dissolved in tetrahydrofuran (0.1 M), and then n-butyllithium (1 eq.) was slowly added dropwise at −90° C., followed by stirring at the same temperature for 1 hour. Then, chlorodiphenylborane (1 eq.) was dissolved in toluene (0.3 M), which was then slowly added dropwise to the first reaction product at −78° C., followed by stirring for 1 hour. Thereafter, stirring was performed at room temperature for 12 hours, and the solvent was dried under vacuum, and toluene was added, and a filtrate obtained by removing solids through a filter was dried under vacuum to obtain diphenyl(pyridin-2-yl)borane.

The diphenyl(pyridin-2-yl)borane (1 eq.) was dissolved in tetrahydrofuran (0.1 M), and then a solution of lithium tetramethylcyclopentadienide (Li(CpMe4), 1 eq.) dissolved in tetrahydrofuran (0.1 M) was slowly added dropwise at 0° C., followed by stirring at room temperature overnight. The solvent was dried under vacuum, and toluene/diethyl ether (a volume ratio of 3/1, 0.3 M) was introduced to dissolve, and MC14 (1 eq.) was mixed with toluene (0.2 M), which was then introduced at −78° C., followed by stirring at room temperature overnight. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered and dried under vacuum to obtain dichloro{diphenyl(pyridin-2-yl-KN)(η$^5$-2,3,4,5-tetramethylcyclopenta-2,4-dien-1-ylidene)borate}zirconium (IV).

Dichloro{diphenyl(pyridin-2-yl-KN)(r1$^5$-2,3,4,5-tetramethylcyclopenta-2,4-dien-1-ylidene)borate}zirconium(IV) (1 eq.) was dissolved in toluene/diethyl ether (a volume ratio of 3/1, 0.3 M), and then a solution of methyl lithium (2 eq.) dissolved in hexane or diethyl ether was slowly added dropwise at −78° C., followed by stirring at room temperature for 12 hours. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered, and dried under vacuum to obtain a precursor compound.

$^1$H NMR (500 MHz, CDCl3, ppm): 5 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H)

Comparative Synthesis Example 1

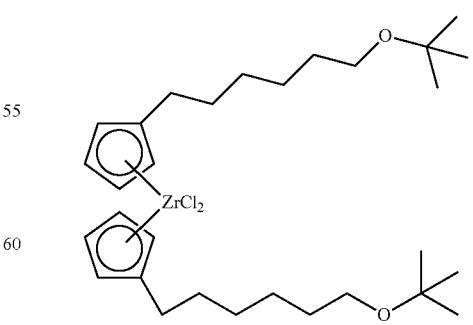

t-butyl-O—(CH$_2$)$_6$—Cl was prepared by a method described in a literature (Tetrahedron Lett. 2951(1988)) using 6-chlorohexanol, and reacted with cyclopentadienyl sodium (NaCp) to obtain t-butyl-O—(CH$_2$)$_6$—C$_5$H$_5$ (yield 60%, b.p. 80° C./0.1 mmHg).

Further, t-butyl-O—(CH$_2$)$_6$—C$_5$H$_5$ was dissolved in tetrahydrofuran (THF) at −78° C., and n-butyl lithium (n-BuLi) was slowly added thereto. Thereafter, it was heated to room temperature and reacted for 8 hours. The lithium salt solution synthesized as described above was slowly added to a suspension solution of ZrCl$_4$(THF)$_2$ (170 g, 4.50 mmol)/THF (30 mL) at −78° C., and further reacted for about 6 hours at room temperature. All volatiles were removed by drying under vacuum and the resulting oily liquid material was filtered by adding hexane. The filtered solution was dried under vacuum, and hexane was added to obtain a precipitate at a low temperature (−20° C.). The obtained precipitate was filtered at a low temperature to obtain a white solid of [tert-butyl-O—(CH$_2$)$_6$—C$_5$H$_{4}$]$_2$ZrCl$_2$](yield 92%).

$^1$H-NMR (300 MHz, CDCl3): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H)

$^{13}$C-NMR (CDCl$_3$): 135.09, 116.66, 112.28, 72.42, 61.52, 30.66, 30.31, 30.14, 29.18, 27.58, 26.00

Comparative Synthesis Example 2

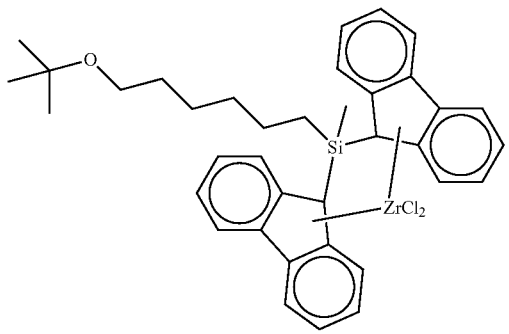

1.0 mole of tert-butyl-O—(CH$_2$)$_6$MgCl solution which is a Grignard reagent was obtained from reaction of a tert-butyl-O—(CH$_2$)$_6$Cl compound and Mg(0) in a THF solvent. The prepared Grignard compound was added to a flask containing a (CH$_3$)SiCl3 compound (176.1 mL, 1.5 mol) and THF (2.0 mL) at −30° C., and then stirred at room temperature for 8 hours. The filtered solution was dried under vacuum to obtain a tert-butyl-O—(CH$_2$)$_6$Si(CH$_3$)Cl$_2$ compound (yield 92%).

Fluoren (Flu, 3.33 g, 20 mmol) and hexane (100 mL) and MTBE (methyl tert-butyl ether, 1.2 mL, 10 mmol) were added to the reactor at −20° C., and 8 mL of n-BuLi (2.5M in Hexane) was slowly added, followed by stirring at room temperature for 6 hours. After completing the stirring, the reactor temperature was cooled to −30° C., and a fluorenyl lithium solution thus prepared was slowly added over 1 hour to a tert-butyl-O—(CH$_2$)$_6$Si(CH$_3$)Cl$_2$ (2.7 g, 10 mmol) solution dissolved in hexane (100 ml) at −30° C. After stirring at room temperature for 8 hours or longer, the solution was extracted by adding water, and evaporated to obtain a (tert-butyl-O—(CH$_2$)$_6$)(CH$_3$)Si(9-C$_{13}$H$_{10}$)$_2$ compound (5.3 g, yield 100%). A structure of the ligand was identified by $^1$H-NMR.

$^1$H NMR (500 MHz, CDCl$_3$): −0.35 (CH$_3$Si, 3H, s), 0.26 (Si—CH$_2$, 2H, m), 0.58 (CH$_2$,2H, m), 0.95 (CH$_2$, $_4$H, m), 1.17(tert-butyl-O, 9H, s), 1.29(CH$_2$,2H, m), 3.21(tert-butyl-O—CH$_2$,2H, t), 4.10(Flu-9H, 2H, s), 7.25(Flu-H, 4H, m), 7.35(Flu-H, 4H, m), 7.40(Flu-H, 4H, m), 7.85(Flu-H, 4H, d).

4.8 ml of n-BuLi (2.5 M in Hexane) was slowly added to a (tert-butyl-O—(CH$_2$)$_6$)(CH$_3$)Si(9-C$_{13}$H$_{10}$)$_2$ (3.18 g, 6 mmol)/MTBE (20 mL) solution at −20° C. The solution was reacted for 8 hours or longer while raising temperature to room temperature. Then, a dilithium salt slurry solution thus prepared was slowly added to a slurry solution of ZrC14 (THF)$_2$ (2.26 g, 6 mmol)/hexane (20 mL) at −20° C., and they were further reacted at room temperature for 8 hours. Precipitates were filtered and washed with hexane several times to obtain a red solid of (tert-butyl-O—(CH$_2$)$_6$) (CH$_3$) Si(9-C$_{13}$H$_9$)$_2$ZrCl$_2$ compound (4.3 g, yield 94.5%).

$^1$H NMR (500 MHz, C$_6$D6): 1.15(tert-butyl-O, 9H, s), 1.26 (CH$_3$Si, 3H, s), 1.58 (Si—CH$_2$,2H, m), 1.66 (CH$_2$, $_4$H, m), 1.91(CH$_2$, $_4$H, m), 3.32(tert-butyl-O—CH$_2$,2H, t), 6.86 (Flu-H, 2H, t), 6.90 (Flu-H, 2H, t), 7.15 (Flu-H, 4H, m), 7.60 (Flu-H, 4H, dd), 7.64(Flu-H, 2H, d), 7.77(Flu-H, 2H, d).

Preparation of Supported Catalyst

Preparation Example 1

50 mL of toluene was added to a pico reactor, and then 7 g of silica gel (SYLOPOL 952X, calcinated under 250° C.) was added under Ar, and then 10 mmol of methylaluminoxane (MAO) was slowly injected at room temperature and allowed to react under stirring at 95° C. for 24 hours. After completing the reaction, the solution was cooled to room temperature, and left for 15 minutes, and the solvent was decanted using a cannula. Toluene (400 mL) was added, and stirred for 1 minute and left for 15 minutes, and then the solvent was decanted using a cannula.

60 μmol of the metallocene compound of Synthesis Example 1 was dissolved in 30 mL of toluene, and transferred to a reactor using a cannula, and allowed to react under stirring at 80° C. for 2 hours. When the reaction was completed and precipitation was completed, the solution was cooled to room temperature and left for 15 minutes, and the solvent was decanted using a cannula. The supernatant was removed, and the remaining reaction product was washed with toluene. After washing again with hexane, 2 wt % of N,N-bis(2-hydroxyethyl)pentadeylamine (Atmer 163) as an antistatic agent, based on the weight of silica (g), was dissolved in 3 mL of hexane, followed by stirring at room temperature for 10 minutes. When the reaction was completed and precipitation was completed, the supernatant was removed and the remaining product was transferred to a glass filter to remove the solvent.

Primary drying was performed at room temperature under vacuum for 5 hours, and secondary drying was performed at 45° C. under vacuum for 4 hours to obtain a silica supported metallocene catalyst in the form of solid particles.

Comparative Preparation Example 1: Preparation of Supported Hybrid Catalyst 5.0 kg of a toluene solution was added to a 20 L stainless steel (sus) high pressure reactor, and the reactor temperature was maintained at 40° C. 1000 g of silica (SP948, manufactured by Grace Davison Co.) dehydrated at a temperature of 600° C. for 12 hours under vacuum was added to the reactor to sufficiently disperse the silica. 84 g of the metallocene compound of Comparative Synthesis Example 1 was dissolved in toluene, added thereto, and then allowed to react under stirring at 200 rpm at 40° C. for 2 hours. Thereafter, the stirring was stopped, followed by settling for 30 minutes and decantation of the reaction solution.

2.5 kg of toluene was added to the reactor, and 9.4 kg of 10 wt % methylaluminoxane (MAO)/toluene solution was added thereto, followed by stirring at 200 rpm at 40° C. for 12 hours. Thereafter, the stirring was stopped, followed by settling for 30 minutes and then decantation of the reaction solution. 3.0 kg of toluene was added and stirred for 10 minutes, and then stirring was stopped, followed by settling for 30 minutes and then decantation of the toluene solution.

3.0 kg of toluene was added to the reactor, and 116 g of the metallocene compound of Comparative Synthesis Example 2 was dissolved in 1 L of the toluene solution and added to the reactor, and allowed to react under stirring at 200 rpm at 40° C. for 2 hours. At this time, a ratio of the metallocene compound of Comparative Synthesis Example 1 and the metallocene compound of Comparative Synthesis Example 2 was 1:1.2 on a molar basis. After lowering the reactor temperature to room temperature, the stirring was stopped, followed by settling for 30 minutes and decantation of the reaction solution.

2.0 kg of toluene was added to the reactor and stirred for 10 minutes. Then, the stirring was stopped, followed by settling for 30 minutes and decantation of the reaction solution.

3.0 kg of hexane was added to the reactor, the hexane slurry was transferred to a filter drier, and the hexane solution was filtered. 1 kg-$SiO_2$ supported hybrid catalyst was prepared by drying under reduced pressure at 40° C. for 4 hours.

Preparation of Polyethylene

Example 1

The metallocene supported catalyst prepared in Preparation Example 1 was put into a 220 L reactor of a pilot plant in a single slurry polymerization process to prepare a high-density polyethylene according to the common method. 10 kg/hr of ethylene and 3.4 g/hr of hydrogen were continuously reacted in a hexane slurry state at a reactor temperature of 80° C. Here, 5 mL/min of 1-butene was added as a comonomer. After the reaction, a high-density polyethylene in the form of powder was prepared through solvent removal and drying processes.

Example 2

A high-density polyethylene in the form of powder was prepared in the same polymerization process as in Example 1, except that the input amount of hydrogen was changed to 0.5 g/hr.

Comparative Example 1

A high-density polyethylene was prepared in the same manner as in Example 1, except that copolymerization of ethylene and 1-butene was performed using the supported hybrid metallocene catalyst prepared in Comparative Preparation Example 1, and the input amounts of ethylene and hydrogen were changed to 10 kg/hr and 2.0 g/hr, respectively.

Comparative Example 2

A high-density polyethylene was prepared in the same manner as in Comparative Example 1, except that the input amounts of ethylene and hydrogen were changed to 15 kg/hr and 0.5 g/hr, respectively.

Comparative Example 3

A high-density polyethylene was prepared in the same manner as in Comparative Example 1, except that the input amounts of ethylene and hydrogen were changed to 10 kg/hr and 1.0 g/hr, respectively.

Experimental Example 1: Evaluation of Physical Properties of Polyethylene

Physical properties were evaluated for the polyethylenes prepared in Examples and Comparative Examples by the following methods, and the results are shown in Table 1 below.

(1) Melt Index

A melt index ($MI_{2.16}$) and a melt index ($MI_5$) were measured at 190° C. under a load of 2.16 kg and 5 kg according to American Society for Testing and Materials (ASTM) D 1238 (condition E), respectively, and the weight (g) of the polymer melted for 10 minutes was recorded as the melt index.

(2) Melt Flow Rate Ratio (MFRR, $MI_5/MI_{2.16}$)

A melt flow rate ratio is a ratio ($MI_5/MI_{2.16}$) obtained by dividing the melt index $MI_5$ (MI, load of 5 kg) by $MI_{2.16}$ (MI, load of 2.16 kg).

(3) Weight Average Molecular Weight and Molecular Weight Distribution (PDI, Polydispersity Index, Mw/Mn) and Log MW (5.5 or More, and 6.5 or More) Ratio According to GPC Analysis A molecular weight distribution (PDI, Mw/Mn) was determined by measuring a weight average molecular weight (Mw) and a number average molecular weight (Mn) of the polymer using gel permeation chromatography (GPC, manufactured by Water), and then dividing the weight average molecular weight by the number average molecular weight.

In detail, PL-GPC220 manufactured by Waters was used as the gel permeation chromatography (GPC) instrument, and a Polymer Laboratories PLgel MIX-B 300 mm length column was used. At this time, the evaluation temperature was 160° C., and 1,2,4-trichlorobenzene was used as a solvent and a flow rate was 1 mL/min. Each of the polymer samples of Examples and Comparative Examples was pretreated by dissolving in 1,2,4-trichlorobenzene containing 0.0125% of butylated hydroxytoluene (BHT) at 160° C. for 10 hours using a GPC analyzer (PLGP220), and prepared at a concentration of 10 mg/10 mL, and then fed in an amount of 200 μL. Mw and Mn were obtained using a calibration curve formed using polystyrene standard specimens. 9 kinds of the polystyrene standard specimens having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

In addition, the ratio (U Hw, unit: %) of an integral value in the region where Log MW is 5.5 or more to a total integral value and the ratio (UH Mw, unit: %) of an integral value in the region where Log MW is 6.5 or more to a total integral value in a log graph with respect to the weight average molecular weight (Mw) of the polyethylene thus measured, which is a GPC curve graph wherein the x-axis is log Mw and the y-axis is dw/dlogMw, were calculated and shown in Table 1 below.

(4) Crystallization Temperature (Tc) and Melting Temperature (Tm)

Crystallization temperatures ($Tc_{10}$, $Tc_{40}$, $Tc_{10}Tc_{40}$) and melting temperatures ($Tm_{10}$, $Tm_{40}$) of polyethylene was measured using a differential scanning calorimeter (DSC, instrument name: DSC 2500, manufacturer: TA instrument).

In detail, polyethylene was heated to 200° C. by increasing the temperature, and maintained at the same temperature for 5 minutes (removing a 1$^{st}$ RUN heat history), then cooled to 30° C. When the temperature was raised again, the summit temperature of endothermic peak corresponding to the top of DSC (Differential Scanning Calorimeter, manufactured by TA) curve was measured as the melting temperature (Tm). At this time, the measurement was performed at the heating and cooling rates of 10° C./min and 40° C./min, respectively.

In other words, the melting temperatures ($Tm_{10}$, $Tm_{40}$) were measured at the summit temperature of endothermic peak at the heating rates of 10° C./min and 40° C./min in a second heating run (2$^{nd}$ RUN), respectively and the crystallization temperatures ($Tc_{10}$, $Tc_{40}$) represent the summit temperature of exothermal peak measured at the cooling rates of 10° C./min and 40° C./min in a second cooling run (2$^{nd}$ RUN), respectively.

(5) Density(g/cm$^3$)

A density (g/cm$^3$) of the polyethylene was measured according to American Society for Testing and Materials (ASTM) D 1505.

TABLE 1

|  | Example 1 | Example 2 | Comparative Example 1 | Comparative Example 2 | Comparative Example 3 |
|---|---|---|---|---|---|
| $MI_{2.16}$ (g/10 min) | 1.03 | 1.05 | 1.1 | 0.72 | 0.88 |
| MFRR ($MI_5/MI_{2.16}$) | 3.58 | 3.91 | 4.4 | 3.75 | 4.01 |
| H Mw (log Mw ≥5.5, %) | 8.49 | 8.91 | 11.69 | 10.27 | 9.5 |
| UH Mw (log Mw ≥6.5, %) | 0.2 | 0.2 | 0.1 | 0.3 | 0.2 |
| UH/H | 0.024 | 0.022 | 0.009 | 0.029 | 0.021 |
| Mw (g/mol) | 106439 | 112033 | 144364 | 128399 | 94481 |
| PDI (Mw/Mn) | 11.89 | 11.27 | 11.87 | 11.97 | 12.24 |
| $Tc_{10}$ (° C.) | 115.78 | 116.56 | 115.09 | 116.72 | 116 |
| $Tc_{40}$ (° C.) | 113.8 | 113.79 | 107.23 | 111.58 | 110.53 |
| $Tc_{10}/Tc_{40}$ | 1.017 | 1.024 | 1.073 | 1.046 | 1.049 |
| $Tm_{10}$ (° C.) | 129.11 | 128.01 | 130.02 | 129.42 | 129.61 |
| $Tm_{40}$ (° C.) | 127.66 | 127.31 | 129.72 | 129.32 | 128.62 |
| $Tm_{10}/Tm_{40}$ | 1.011 | 1.005 | 1.002 | 1.001 | 1.008 |
| Density (g/cm$^3$) | 0.951 | 0.951 | 0.951 | 0.952 | 0.952 |

Referring to Table 1, it was found that the polyethylenes of Examples 1 to 2 were prepared as HDPE resins having a high crystallization temperature (Tc) according to the control of the molecular weight distribution (the content of high molecular weight), and their ratio of $Tc_{10}/Tc_{40}$ is 1.017 to 1.024, which approximates 1, and the dependence on processing conditions was reduced, and thus the hair generation rate may be reduced.

The invention claimed is:

1. A polyethylene,
   of which an integral value in a region where Log Mw is 5.5 or more in a GPC curve of the polyethylene, wherein the x-axis is log Mw and the y-axis is dw/dlogMw, is 9% or less of the total integral value; and
   of which a ratio ($Tc_{10}/TC_{40}$) of a crystallization temperature ($Tc_{10}$) measured at a cooling rate of 10° C./min to a crystallization temperature ($Tc_{40}$) measured at a cooling rate of 40° C./min is less than 1.04.

2. The polyethylene of claim 1, of which the integral value in the region where Log Mw is 5.5 or more in the GPC curve of the polyethylene is 5% to 9% of the total integral value.

3. The polyethylene of claim 1, of which an integral value in a region where Log Mw is 6.5 or more in a GPC curve of the polyethylene, wherein the x-axis is log Mw and the y-axis is dw/dlogMw, is 0.3% or less of the total integral value.

4. The polyethylene of claim 1, of which a ratio (UH/H) of an integral value (UH Mw) in a region where Log Mw is 6.5 or more to an integral value (H Mw) in a region where Log Mw is 5.5 or more in a GPC curve of the polyethylene, wherein the x-axis is log Mw and the y-axis is dw/dlogMw, is 0.02 or more.

5. The polyethylene of claim 1, of which a molecular weight distribution (Mw/Mn) is 10 to 13.

6. The polyethylene of claim 1, of which a weight average molecular weight is 90000 g/mol to 120000 g/mol.

7. The polyethylene of claim 1, of which the ratio ($Tc_{10}/Tc_{40}$) of the crystallization temperature ($Tc_{10}$) measured at a cooling rate of 10° C./min to the crystallization temperature ($Tc_{40}$) measured at a cooling rate of 40° C./min is 1 or more and less than 1.04.

8. The polyethylene of claim 1, of which the crystallization temperature ($Tc_{40}$) measured at a cooling rate of 40° C./min is 113° C. or higher, and the crystallization temperature ($Tc_{10}$) measured at a cooling rate of 10° C./min is 115° C. to 117° C.

9. The polyethylene of claim 1, of which a ratio ($Tm_{10}/Tm_{40}$) of a melting temperature ($Tm_{10}$) measured at a heating rate of 10° C./min to a melting temperature ($Tm_{40}$) measured at a heating rate of 40° C./min is 1.004 to 1.012.

10. The polyethylene of claim 1, of which a melting temperature ($Tm_{40}$) measured at a heating rate of 40° C./min is 117° C. to 118° C., and a melting temperature (Tm$_{10}$) measured at a heating rate of 10° C./min is 128° C. to 130° C.

11. The polyethylene of claim 1, wherein the polyethylene is a copolymer of a C$_{4-20}$ alpha-olefin monomer and ethylene.

12. A method of preparing the polyethylene of claim 1, comprising the step of polymerizing ethylene and an alpha-olefin monomer in the presence of a catalyst composition including a metallocene compound represented by the following Chemical Formula 1:

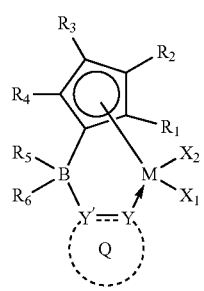

[Chemical Formula 1]

in Chemical Formula 1,

B is boron,

M is a Group 4 transition metal,

R$_1$ to R$_4$ are each independently hydrogen, C$_{1-20}$ alkyl, C$_{3-20}$ cycloalkyl, or C$_{6-20}$ aryl, or R$_1$ and R$_2$ or R$_3$ and R$_4$ are connected to each other to form a substituted or unsubstituted C$_{6-60}$ aromatic ring, R$_5$ and R$_6$ are each independently C$_{1-20}$ alkyl, C$_{3-20}$ cycloalkyl, or C$_{6-20}$ aryl, or R$_5$ and R$_6$ are connected to each other to form a C$_{3-60}$ aliphatic ring or a C$_{6-60}$ aromatic ring, X$_1$ and X$_2$ are each independently C$_{1-20}$ alkyl or —O(CO)R', wherein R' is C$_{1-20}$ alkyl, Q is a substituted or unsubstituted C$_{2-60}$ hetero ring including any one or more selected from the group consisting of N, O, and S, Y and Y' are elements constituting Q, Y is N, O, or S, and Y' is an element of Q, and is adjacent to Y, and is N or C.

13. The method of claim 12, wherein R$_1$ to R$_4$ are each independently hydrogen, or methyl, or R$_1$ and R$_2$ or R$_3$ and R$_4$ are connected to each other to form a benzene ring or a 1,2,3,4-tetrahydronaphthalene ring, wherein the benzene ring or the 1,2,3,4-tetrahydronaphthalene ring is unsubstituted or substituted with one substituent to four substituents selected from the group consisting of methyl, tert-butyl, and 4-tert-butyl phenyl.

14. The method of claim 12, wherein R$_5$ and R$_6$ are each independently methyl or phenyl, or R$_5$ and R$_6$ are connected to each other to form a cyclooctane ring.

15. The method of claim 12, wherein the compound represented by Chemical Formula 1 is any one of compounds represented by the following structural formulae:

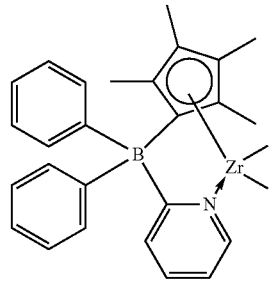

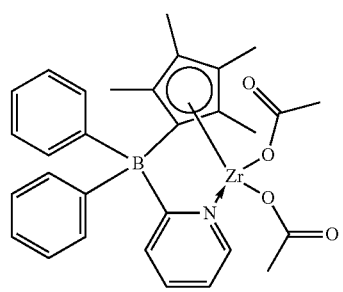

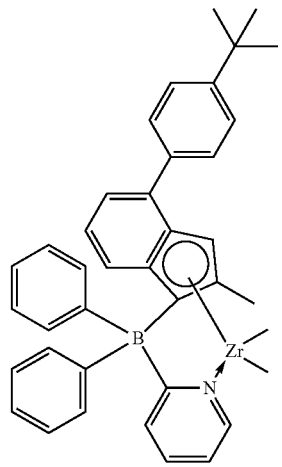

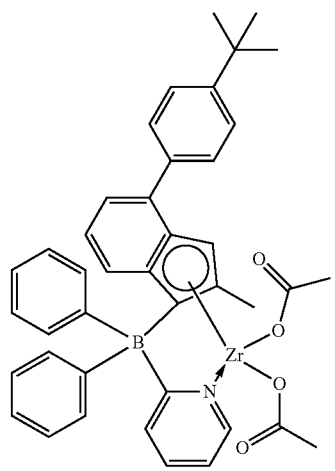

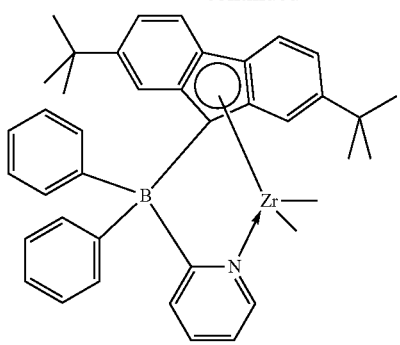
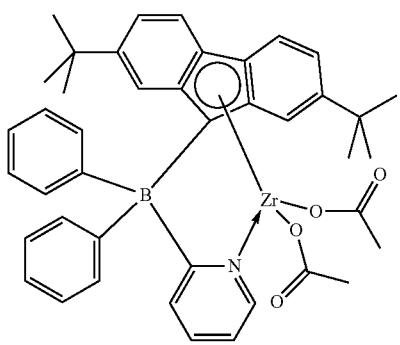
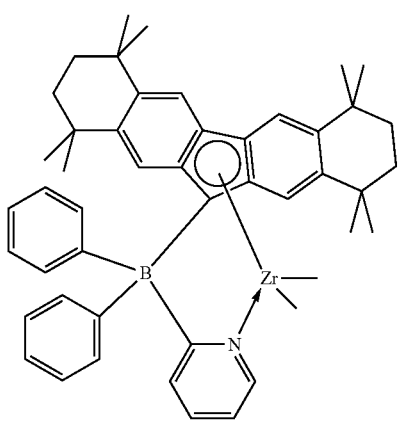
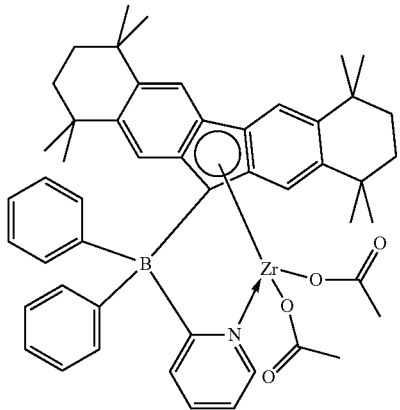
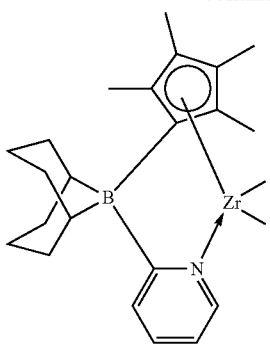
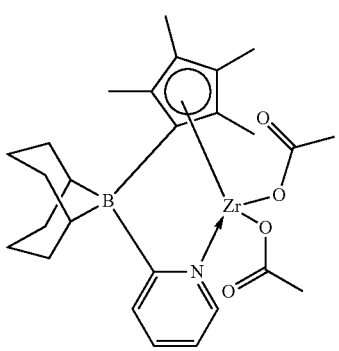
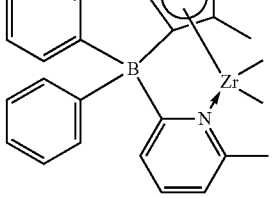
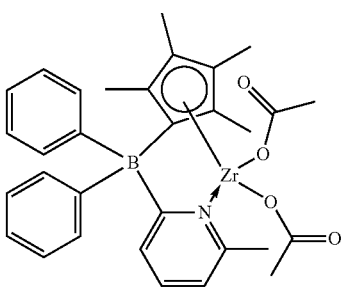
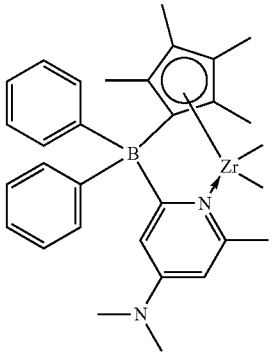

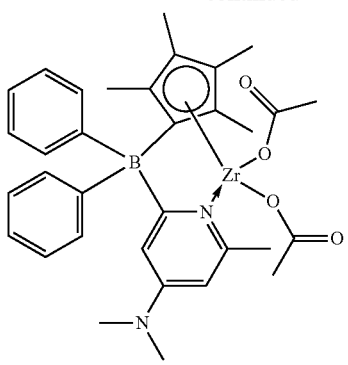
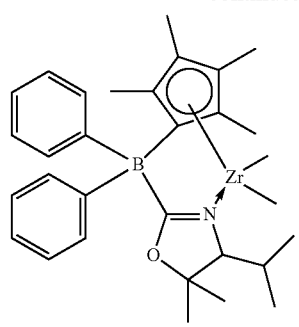
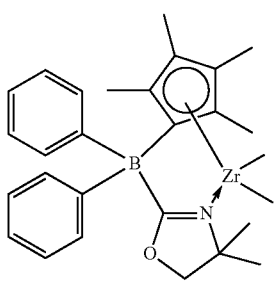
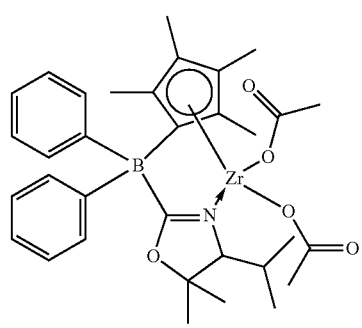
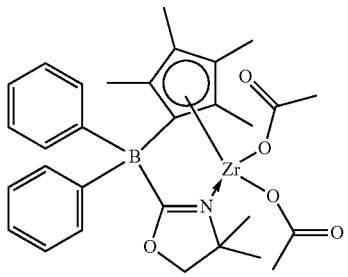
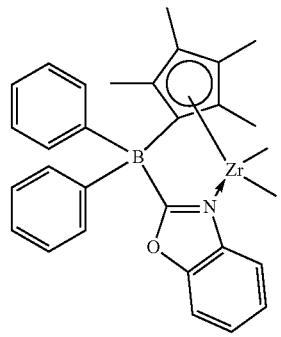
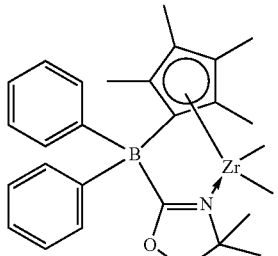
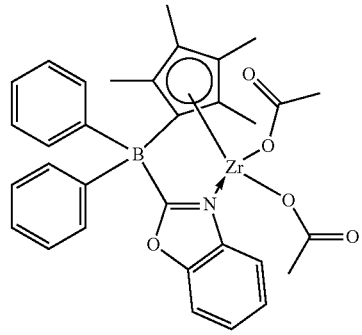
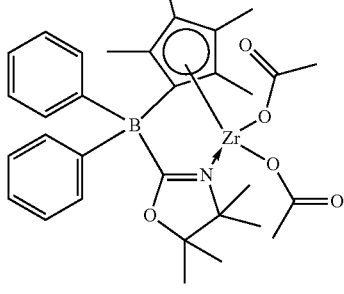
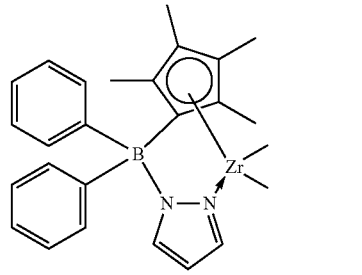

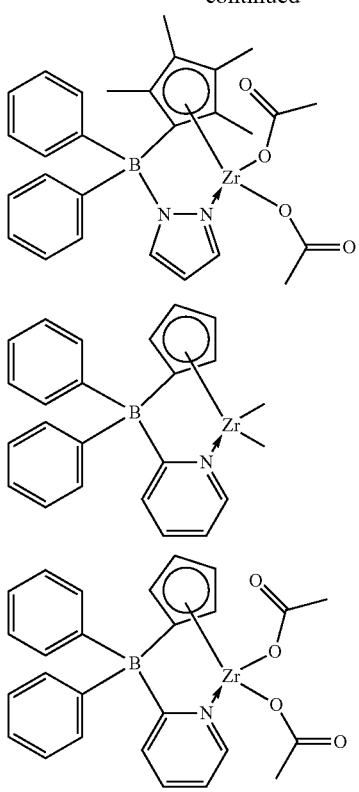
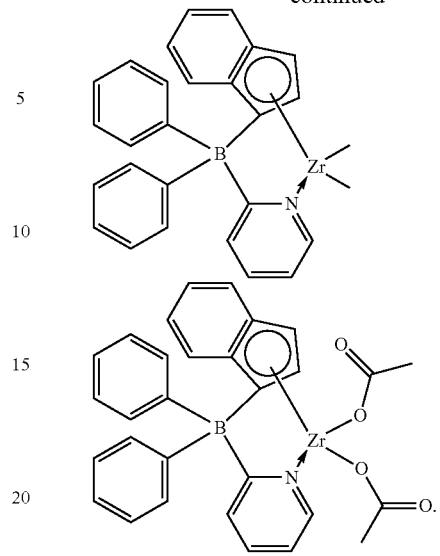

16. The method of claim 12, wherein Q is a pyridine ring, a quinoline ring, a 4,5-dihydrooxazole ring, a pyrazole ring, or a benzoxazole ring, each of which is unsubstituted or substituted with one substituent to four substituents selected from the group consisting of methyl, isopropyl, and diphenylamino.

17. An injection-molded product comprising the polyethylene according to claim 1.

* * * * *